(12) United States Patent
Ogawa

(10) Patent No.: US 10,425,404 B2
(45) Date of Patent: Sep. 24, 2019

(54) AUTHENTICATION SYSTEM, REMINDER TERMINAL, AND INFORMATION RECORDING MEDIUM

(71) Applicant: Passlogy Co., Ltd., Tokyo (JP)

(72) Inventor: Hideharu Ogawa, Tokyo (JP)

(73) Assignee: PASSLOGY, CO., LTD., Tokyo (JP)

( * ) Notice: Subject to any disclaimer, the term of this patent is extended or adjusted under 35 U.S.C. 154(b) by 153 days.

(21) Appl. No.: 15/509,459

(22) PCT Filed: Sep. 8, 2015

(86) PCT No.: PCT/JP2015/075391
§ 371 (c)(1),
(2) Date: Mar. 7, 2017

(87) PCT Pub. No.: WO2016/039309
PCT Pub. Date: Mar. 17, 2016

(65) Prior Publication Data
US 2017/0279790 A1    Sep. 28, 2017

(30) Foreign Application Priority Data
Sep. 8, 2014    (WO) .................. PCT/JP2014/073704

(51) Int. Cl.
*H04L 29/06* (2006.01)
*G06F 21/34* (2013.01)
(Continued)

(52) U.S. Cl.
CPC ............ *H04L 63/083* (2013.01); *G06F 21/34* (2013.01); *G06F 21/36* (2013.01); *H04L 9/0891* (2013.01);
(Continued)

(58) Field of Classification Search
CPC ..... H04L 63/083; H04L 9/3226; H04L 63/10; H04L 63/08; H04L 63/0428;
(Continued)

(56) References Cited

U.S. PATENT DOCUMENTS

| 6,571,336 | B1 * | 5/2003 | Smith, Jr. | ............... | G06F 21/46 |
| | | | | | 380/44 |
| 2004/0139331 | A1 * | 7/2004 | Sanai | ...................... | G06F 21/36 |
| | | | | | 713/184 |

(Continued)

FOREIGN PATENT DOCUMENTS

| EP | 1475721 A1 | 11/2004 |
| JP | 2002366517 A | 12/2002 |

(Continued)

OTHER PUBLICATIONS

U.S. Office Action dated Sep. 21, 2017, from U.S. Appl. No. 15/619,034, filed Jun. 9, 2017.

(Continued)

*Primary Examiner* — Ali S Abyaneh
(74) *Attorney, Agent, or Firm* — K&L Gates LLP; Louis C. Cullman; Dennis A. Majewski

(57) ABSTRACT

A reminder terminal creates a table having random letter strings in elements. A user views the created table and registers, at a resource server, a password obtained by arranging first letter strings contained in first elements extracted from the viewed table in accordance with a selection sequence. The created table is stored at the reminder terminal. When the user accesses the resource server, the reminder terminal presents the stored table to the user and transmits information indicative that the stored table is presented. The user obtains a password for the resource server by arranging second letter strings contained in second elements extracted from the presented table in accordance with the selection sequence. Unless the information is (Continued)

received by a management server, the resource server does not permit the user to access contents of the resource server.

10 Claims, 20 Drawing Sheets

(51) Int. Cl.
    *G06F 21/36*     (2013.01)
    *H04L 9/08*     (2006.01)
    *H04L 9/12*     (2006.01)
    *H04L 9/32*     (2006.01)
    *H04W 12/06*     (2009.01)

(52) U.S. Cl.
    CPC .............. *H04L 9/12* (2013.01); *H04L 9/3226* (2013.01); *H04L 9/3297* (2013.01); *H04L 63/08* (2013.01); *H04L 63/0853* (2013.01); *H04W 12/0608* (2019.01); *H04L 9/3273* (2013.01); *H04L 63/10* (2013.01); *H04L 63/20* (2013.01)

(58) Field of Classification Search
    CPC ......... H04L 29/06782; H04L 29/06795; H04L 63/0846; G06F 21/31
    See application file for complete search history.

(56) References Cited

U.S. PATENT DOCUMENTS

| | | |
|---|---|---|
| 2006/0248344 A1 | 11/2006 | Yang |
| 2007/0089166 A1* | 4/2007 | Medjitov ................ G06F 21/36 726/5 |
| 2008/0276098 A1* | 11/2008 | Florencio ................ G06F 21/46 713/183 |
| 2010/0107229 A1 | 4/2010 | Najafi et al. |
| 2011/0191592 A1* | 8/2011 | Goertzen ................ G06F 21/36 713/182 |
| 2011/0202981 A1 | 8/2011 | Tamai et al. |
| 2011/0277021 A1* | 11/2011 | Ogawa .................... G06F 21/36 726/6 |
| 2013/0312088 A1 | 11/2013 | Zhang |

FOREIGN PATENT DOCUMENTS

| | | |
|---|---|---|
| JP | 2006-311529 A | 11/2006 |
| JP | 2007108833 A | 4/2007 |
| JP | 2008027222 A | 2/2008 |
| JP | 2008234440 A | 10/2008 |
| JP | 2009301446 A | 12/2009 |
| JP | 2011215753 A | 10/2011 |
| WO | 2001/084359 A2 | 11/2001 |
| WO | 2012029776 A1 | 3/2012 |
| WO | 2013070124 A1 | 5/2013 |

OTHER PUBLICATIONS

Communication from European Patent Office for European Patenet Application No. 11821792.6 dated Oct. 11, 2017.
Conorich, Douglas G. Data Security Management: Effective management of UNIX passwords. Apr. 23, 2008 Retrieved from the Internet: URL:http://www.ittoday.info/AIMS/DSM/8301101.pdf. Retrieved on Oct. 4, 2016.
Extended European Search Report for European Patent Application No. 15840293.3 dated Mar. 12, 2018.
Examination Report for Indian Patent Application Serial No. 905/KOLNP/2013 dated Feb. 28, 2019.

* cited by examiner

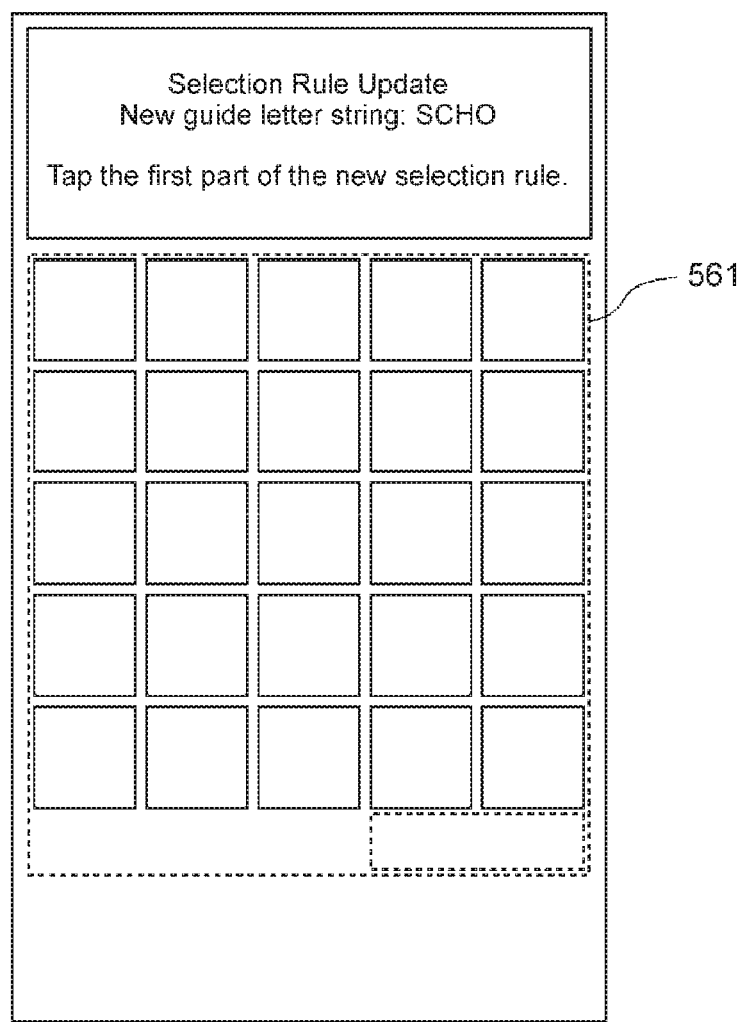

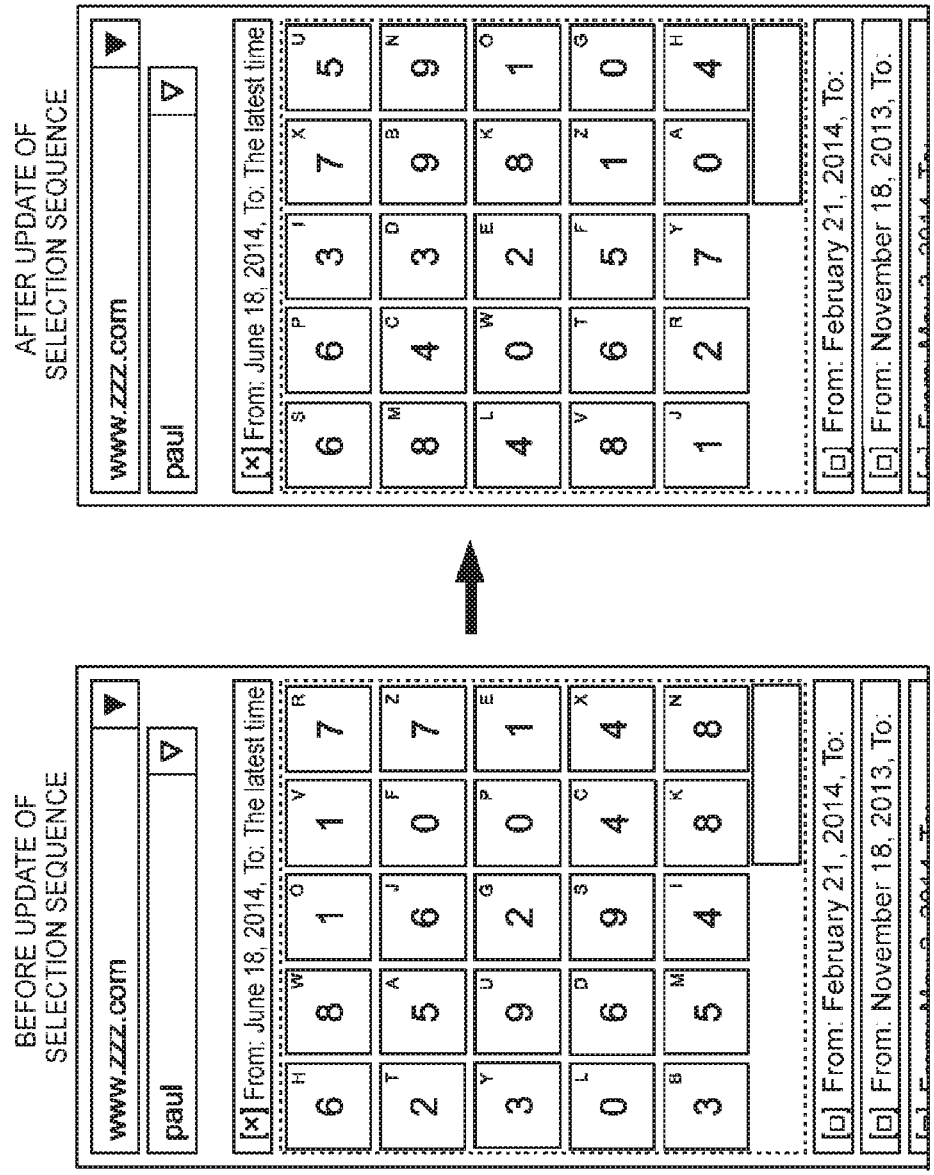

AUTHENTICATION SYSTEM, REMINDER TERMINAL, AND INFORMATION RECORDING MEDIUM

TECHNICAL FIELD

The present disclosure relates to an authentication system suitable for managing, at a reminder terminal, a password to decide an acceptance or a rejection of a request for utilizing the resource of a resource server, the reminder terminal, and a non-transitory computer readable information recording medium having stored therein a program that causes a computer to function as the reminder terminal.

BACKGROUND ART

Conventionally, systems that cause a user to enter a password in order to decide the acceptance or the rejection of a utilization of the resource provided by a resource server are in practical use. In this case, the resource to be provided is in various forms, such as exchanging of various files, storing thereof, viewing of mails, news, still images, motion images, and listening of music, and utilization of various applications.

In this case, the resource server stores a password itself or a random letter string obtained by applying a one-way hash function to such a password for the purpose of a decision to accept or reject the resource utilization. Note that a scheme of adding a letter string called a salt and defined for each user to the password, and then applying a hash function is also adopted. When the one-way hash function is applied, the consistency of the password is checked for an authentication by not comparing the password letter string itself but comparing the hash value of the entered password by the user with the stored hash value in the resource server.

In general, since resource servers are operated by various service providers, the configuration of the resource server and the setting thereof may differ, and there is a difference in security level based on such a difference. Hence, a certain server may be attacked, security information may be revealed from a company member, or the information may be revealed by a user's carelessness, and the password may be revealed.

In this case, when the common password is applied for the multiple resource servers, if the password for one of the resource servers is revealed, an authorized access to the other resource servers is enabled. Hence, the password that is different for each resource server is desirable.

In addition, a Brute-force attack which enters passwords in sequence that are letter strings, or the like, described in a dictionary, and which attempt to log in the resource server is known. Therefore, a password formed of a letter string created at random is desirable. However, such a letter string is not easy for a human person to memorize.

In this case, the following literatures disclose technologies of managing a large number of passwords which are different for each resource server, and which are not easy to memorize.

CITATION TABLE

Patent Literature

Patent Literature 1: Unexamined Japanese Patent Application Kokai Publication No. 2007-108833

Patent Literature 2: International Publication No. WO 2012/029776

SUMMARY OF INVENTION

Technical Problem

According to those technologies, when the user enters a single master password or key at a reminding device that manages the password, the password for each resource server is obtained. However, a technology of obtaining the password for each resource server without a direct entry of the master password or key, and of maintaining the random nature of the password for each resource server is desired.

The present disclosure has been made in order to address the foregoing technical problems, and an objective is to provide an authentication system suitable for managing, at a reminder terminal, a password to decide an acceptance or a rejection of a request for utilizing the resource of a resource server, the reminder terminal, and a non-transitory computer readable information recording medium having stored therein a program that causes a computer to function as the reminder terminal.

Solution to Problem

An authentication system according to the present disclosure includes a reminder terminal, a resource server, a management server, and an access terminal, in which:

(A) the reminder terminal includes:

a table creator that creates a table having a piece of a letter string contained in each element, the letter string being created at random;

a password register causing a user to view the created table, and prompting the user to (1) extract the element from the viewing table in accordance with a selection sequence assigned to the user beforehand, and arrange the pieces of the letter string contained in the extracted elements to obtain a registration letter string, and (2) updates and registers or newly registers the obtained registration letter string as a password for a user name of the user at the resource server;

a memory storing the viewing table in association with a combination of a resource server name of the resource server with the user name;

a presenter presenting, to the user upon selection of the combination by a user instruction, the table stored in association with the combination, and prompting the user to (a) extract the element from the presented table in accordance with the selection sequence assigned to the user beforehand, and arrange the pieces of the letter string contained in the extracted elements to obtain an authentication letter string, and (b) apply the obtained authentication letter string as a password for requesting a utilization of a resource of the resource server under the user name; and a transmitter that transmits information indicating that the table stored in association with the combination is presented to the user, (B) the management server sets, upon receiving the information transmitted from the reminder terminal at the management server, a validated time period corresponding to the combination relating to the information, and covering a time point at which the management server receives the information;

(C) the resource server transmits, to the management server, an inquiry relating to the user name when the request for utilizing the resource of the resource server under the user name is transmitted from the access terminal to the resource server, and a password relating to the request matches the registered password for the user name at the resource server;

(D) the management server determines, upon receiving the inquiry at the management server, whether or not an allowance condition in which "the inquiry is received by the management server within the validated time period set for the combination of the server name of the resource server that is a transmission originator of the inquiry with the user name relating to the inquiry" is satisfied, and transmits, to the resource server, a reply designating the determination result; and (E) the resource server transmits, to the access terminal, a response as for the utilization of the resource of the resource server when the reply is received by the resource server, and the received reply indicates that the allowance condition is satisfied.

A reminder terminal according to the present disclosure is the reminder terminal that satisfies the feature (A) in the foregoing authentication system. This reminder terminal transmits, to the other device, an information indicating the combination of the resource server name associated with the presented table based on the user's selection with the user name, enabling the user to refer to the combination at the time of authentication. This reminder terminal is applicable as, for example, a security token.

Advantageous Effects of Invention

According to the present disclosure, provided are an authentication system suitable for managing, at a reminder terminal, a password to decide an acceptance or a rejection of a request for utilizing the resource of a resource server, the reminder terminal, and a non-transitory computer readable information recording medium having stored therein a program that causes a computer to function as the reminder terminal.

BRIEF DESCRIPTION OF DRAWINGS

FIG. 9A is an explanatory diagram illustrating how the user selects a new selection sequence;

FIG. 11 is an explanatory diagram illustrating before and after the other table is updated based on the new selection sequence.

DESCRIPTION OF EMBODIMENTS

Embodiments of the present disclosure will be explained below. The embodiments are for explanation only, and are not intended to limit the scope of the present disclosure. Hence, a person skilled in the art could carry out an embodiment in which each of or all of structural components are replaced with respective equivalents, and such an embodiment is also within the scope of the present disclosure.

First Embodiment

Figure 1:
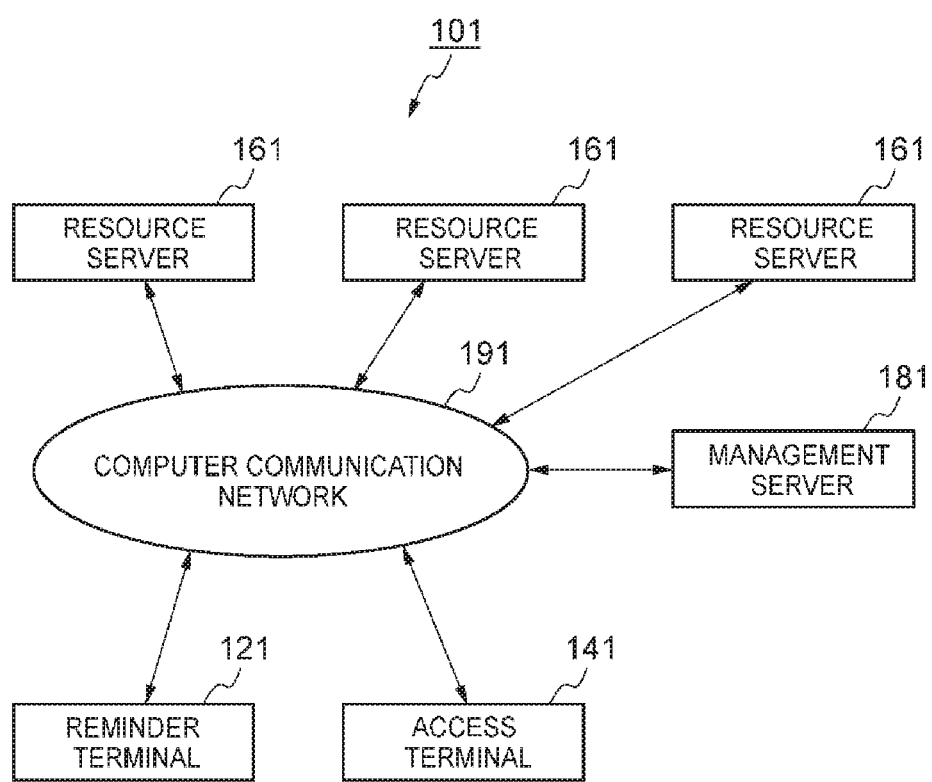
FIG. 1 is an explanatory diagram illustrating an outline of an authentication system according to an embodiment of the present disclosure.

FIG. 1 is an explanatory diagram illustrating an outline of an authentication system according to an embodiment of the present disclosure. The explanation will be given with reference to this figure below.

An authentication system 101 according to this embodiment includes a reminder terminal 121, an access terminal 141, a resource server 161, and a management server 181. Typically, the single management server 181 is prepared for the multiple resource servers 161. However, each resource server 161 may be configured to simultaneously accomplish the function of the management server 181, and the individual management server 181 may be omitted. In addition, the resource server 161 may employ the legitimate authentication by a user name and a password only like conventional technologies, and the management server 181 itself may be omitted.

Those devices are communicable with each other via a computer communication network 191, such as the Internet, a mobile-phone communication network, or a wireless Local Area Network (LAN) like Wireless Fidelity (Wi-Fi). Note that a special-purpose communication line may be applied for the communication between the resource server 161 and the management server 181. In addition, the communication may be encrypted in various forms.

The reminder terminal 121 has a function of presenting, to the user, a password for the user who attempts to utilize the resource of each resource server 161 in a configuration recognizable by the user alone, that is, a configuration so as not to be immediately theft when a third person furtively glances the password. Typical reminder terminals 121 applicable are various mobile terminals, such as a mobile phone, a smartphone, a tablet computer, a Personal Data Assistant (PDA), and a wearable terminal.

The access terminal 141 is a terminal for the user to utilize the resource of the resource server 161. Typically, the user accesses the resource server 161 via the browser activated on the access terminal 141 in order to utilize the resource of the resource server 161. Example access terminals 141 applicable are various stationary computers, and an emulator terminal like an X-terminal. In addition, the same device as the reminder terminal 121 may be utilized as the access terminal 141.

The resource server 161 provides the resource utilization service to the user. The resource server 161 obtains, from the access terminal 141, the entered password by the user at the access terminal 141, and authenticates whether or not the user has an authority for utilization, thereby deciding whether or not to allow the user to utilize the resource. As for the authentication, a user name entered at the access terminal 141 is applicable, but the identification information of the access terminal 141 itself (for example, the Media Access Control (MAC) address for communication, the production number of a Central Processing Unit (CPU), or a session ID contained in the cookie stored in the access terminal 141 beforehand) is also applicable instead of the user name.

A resource server name is assigned to the resource server 161. The resource server name is represented by the server IDentifier (ID) of the computer serving as the resource server 161, for example, a host name, an Internet Protocol (IP) address, a domain name, or a Universal Resource Locator (URL) for providing the resource.

The management server 181 enables the user to refer to the utilization status of the reminder terminal 121 in the authentication executed by the resource server 161.

(Outline)

An outline of a typical configuration according to the present disclosure will be explained below. The reminder terminal 121 creates a table having a random letter string contained in each element, and stores this table in association with the combination of the server name of each resource server 161 with the user name of the user at such a resource server 161.

This table is created by the reminder terminal when the user newly registers the account in each resource server 161, and when the user updates the password for the already-existing account in each resource server 161, and the reminder terminal 121 causes the user to view the created table.

In addition, when the user attempts to utilize the resource of each resource server 161 (when the user attempts to log-in or sign-in), the reminder terminal 121 also presents, to the user, the stored table in the reminder terminal 121 in accordance with the combination of the selected resource server name by the user with the user name.

This table is basically managed within the reminder terminal 121 only, and the contents thereof are not basically informed to each resource server 161 and the management server 181. A back-up process of this table may be executed for each resource server 161 and for the management server 181, but in this case, the desirable back-up process is a process executed on the table that has been encrypted as appropriate.

Prior to the start of utilizing the reminder terminal 121, the user defines an own selection sequence. This selection sequence is commonly applied to all combinations managed by the reminder terminal 121. The basic configuration is in which this selection scheme itself is not information to each resource server 161 and the management server 181.

When the user attempts to newly register in a given resource server 161 at a certain user name, this user enters the combination of the server name of this resource server 161 with the user name of the user. In this case, the reminder terminal 121 creates the table, and causes the user to view this table.

The user extracts the element from the viewing table in accordance with the defined selection sequence by this user, and arranges pieces of the letter string contained in respective extracted elements. In this case, the obtained letter string becomes a registration password to be entered at the time of new registration to the resource server.

The user accesses the resource server 161 from the access terminal 141, and enters the user name and the registration password obtained by viewing the reminder terminal 121, thereby newly registering the account in this resource server.

Hence, the new account registration completes, and the table associated with the combination of the resource server name with the user name is stored in a non-volatile memory medium within the reminder terminal 121, making the details of such a table available when the resource of the resource server 161 is utilized in future.

When the user attempts to utilize the resource of the resource server 161, the combination of the resource server name of the resource server 161 with the user name is selected for the reminder terminal 121. This causes the reminder terminal 121 to present, to the user, the table stored in association with such a combination.

The user extracts the element from the presented table in accordance with the own defined selection sequence, and arranges pieces of the letter string contained in respective extracted elements, thereby obtaining an authentication letter string.

Next, the user accesses the login form for the resource server 161 via the access terminal 141, enters the user name and the authentication letter string as the password, thereby requesting the log-in to the resource server 161.

The resource server 161 determines whether or not the combination of the user name relating to this request with the password is proper. Conventionally well-known password authentication technologies are applicable to this determination.

This embodiment has a feature such that, upon presenting, to the user, the table associated with such a combination, the reminder terminal 121 gives an information to that effect to the external device. Hence, the external device is informed that the owner of the reminder terminal 121 is attempting to log-in the resource server 161 that has the resource server name in the combination under the user name also contained therein.

In the configuration in which such an information is transmitted to the management server 181, the reminder terminal 121 is available as a security token.

Upon receiving the information, the management server 181 sets, for the combination of the resource server name with the user name relating to this information, a validated time period covering the time point at which the information is received. This validated time period is a quite-short time period like within five minutes from the time point at which the information is received.

Conversely, when the resource server 161 that has received the login request from the access terminal 141 determines that the combination of the user name relating to the request with the password is proper, the resource server 161 transmits, to the management server 181, an inquiry designating the resource server name of this resource server 161 and the user name attempting to log-in.

Upon receiving the inquiry, the management server 181 determines whether or not the allowance condition is satisfied. In this configuration, the allowance condition in which "the inquiry is received by the management server 181 within the validated time period set for the combination of the resource server name relating to this inquiry with the user name" is adopted. This means that, when the allowance condition is satisfied, substantially, when the user has viewed the table for the resource server 161 at the reminder terminal 121 when giving the request to the resource server 161. Next, the management server 181 transmits, to the resource server 161, the reply designating the success or failure of the allowance condition.

The resource server 161 determines the allowance or rejection of the utilization of the resource relating to the login request based on the received reply from the management server 181 as for the success or failure. That is, when the following two conditions are satisfied: the combination of the user name with the password is proper; and the table in which the password pieces are embedded at random is recently displayed at the reminder terminal 121, the resource server 161 allows the utilization of the resource. Hence, in this configuration, the reminder terminal 121 is available as a security token.

In this configuration, a pre-registration of the device information on the reminder terminal 121 and the personal information of the user who utilizes the reminder terminal 121 in the management server 181 is desirable. When the management of the personal information on the user associated with the reminder terminal 121 by the management server 181 is assured, a transfer of the personal information on the user to the resource server 161 is unnecessary at the time of new registration to the resource server 161. That is, an operation is enabled in which the personal information is managed by the management server 181 alone, and no personal information is disclosed from the management server 181 to the resource server 161 unless any accident occurs at the resource server 161. This operation is useful for the privacy protection, enhancing the possibility of user registration.

Since each element in the table contains a random letter string piece, the registration letter string and the authentication letter string to be obtained are also at random, and the table is created for each combination of the resource server name with the user name, the occurrence of the redundancy between the registration letter string and the authentication letter string hardly occurs among the multiple resource servers.

Therefore, when the user memorizes the own selection sequence only, such a user is capable of applying a random password without a redundancy among the multiple resource servers 161.

If the reminder terminal 121 is theft, or the table stored in the reminder terminal 121 is subjected to furtive glance, no password for each resource server 161 is revealed since the user's selection sequence is unknown. This enables a safe management of password.

In addition, a configuration is applicable in which the plug-in program is activated over the browser of the access terminal 141, and the access terminal 141 receives an information from the reminder terminal 121 that is confirmed that such a reminder terminal is present at the nearby location to the access terminal 141 based on the status of the wireless communication or of the wired communication. This configuration is applicable to a structure in which the management server 181 is omitted, that is, an embodiment in which the resource server 161 decides the acceptance or rejection of the request based on the user name and the password only. This embodiment will be explained later in detail.

The action of each component according to this embodiment will be explained below in detail.

(Reminder Terminal)

Figure 2:
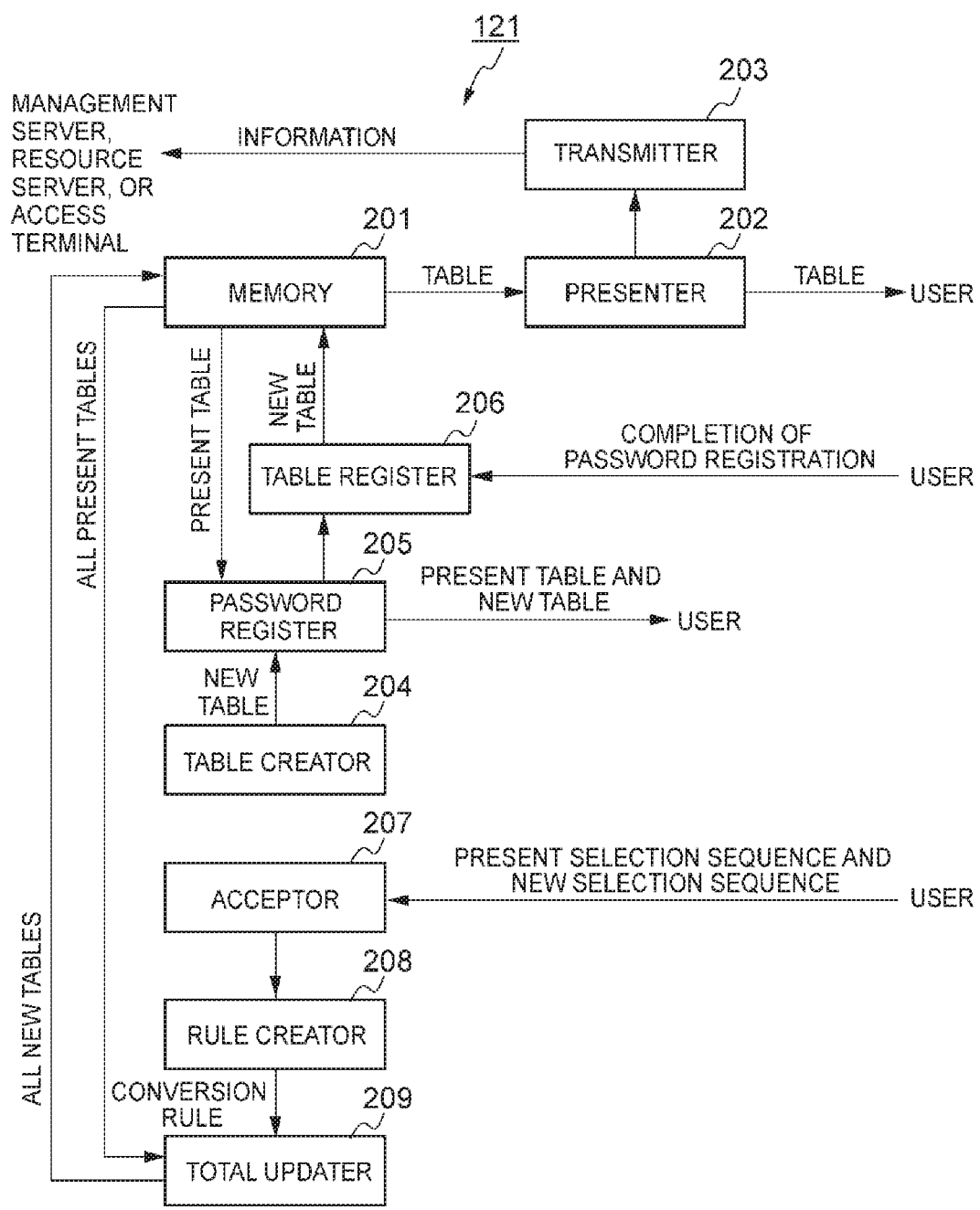
FIG. 2 is an explanatory diagram illustrating an outline of a reminder terminal according to the embodiment of the present disclosure.

FIG. 2 is an explanatory diagram illustrating an outline of the reminder terminal according to the embodiment of the present disclosure. An explanation will be given below based on this figure.

The reminder terminal 121 includes a memory 201, and a presenter 202. In addition, the reminder terminal 121 may include omittable components that are a transmitter 203, a table creator 204, a password register 205, a table register 206, an acceptor 207, a rule creator 208, and a total updater 209. The function of the omitted component may be accomplished by the management server 181 upon easing the restriction for the table sharing.

The memory 201 stores the table in association with the combination of the resource server name of the resource server 161 with the user name applied to access this resource server 161. Each element in each table contains information created at random (for example, various letters, numbers, symbols, figures, and sequences thereof). In addition, each table may have an additional element located in a margin. The additional element may contain the information created at random, may be set by the user at the time of initial registration, or may be omitted.

The stored table in the memory 201 is displayed on the screen of the reminder terminal 121 by the presenter 202 based on the user's selection. In order to maximize the security, this table is desirably stored in the reminder terminal 121 only, and is desirably not shared with the resource server 161 and the management server 181 at all. In this case, when a back-up process of the table stored in the reminder terminal 121 is desired in the resource server 161 and in the management server 181, appropriate encryptions may be applied so as to keep this table in secret unless an allowance for the decryption of the table from the back-up data and the necessary decryption key, or the like, for the decryption are apparently given from the user to the resource server 161 and the management server 181.

Conversely, as will be explained later, although the highest security is not accomplishable, in order to maintain a moderate security level in view of the user convenience, the restriction for the table sharing may be eased, and the table back-up process and the password automatic updating process, and the like, may be cooperatively executed by the reminder terminal 121 and the management server 181 together.

(Table)

Figure 3A:
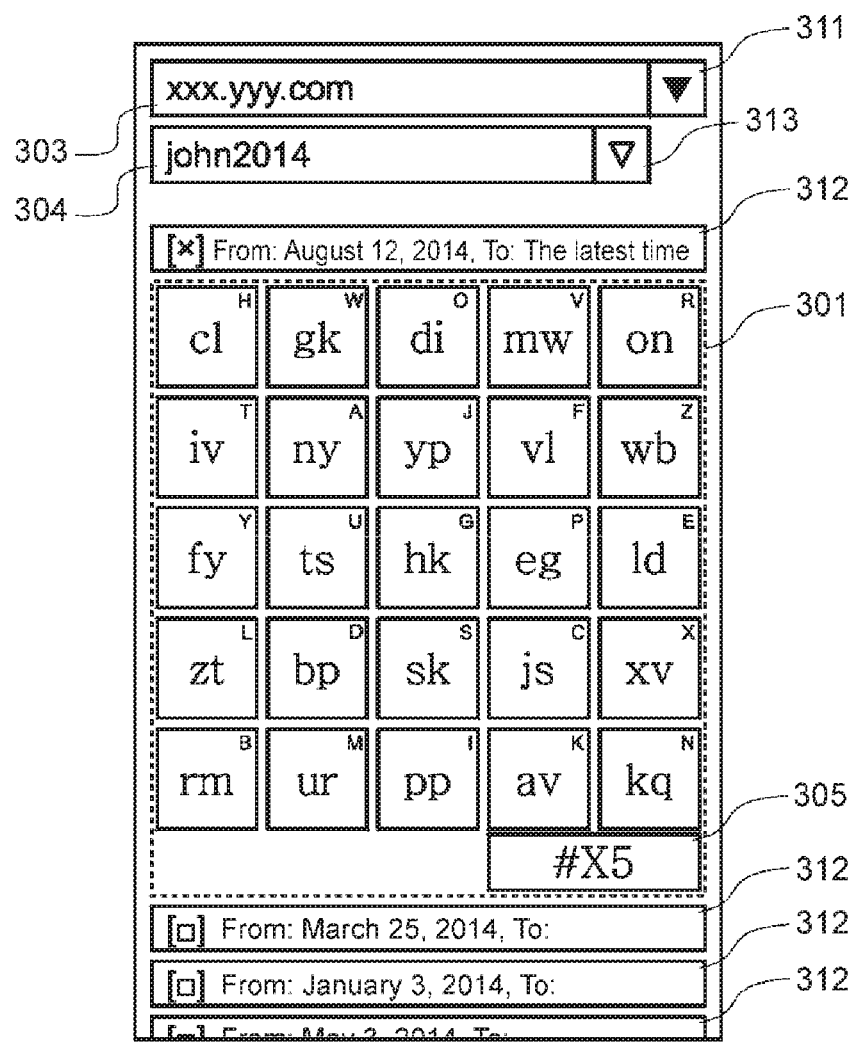
FIG. 3A is an explanatory diagram illustrating how the reminder terminal displays a table according to the embodiment of the present disclosure.
Figure 3B:
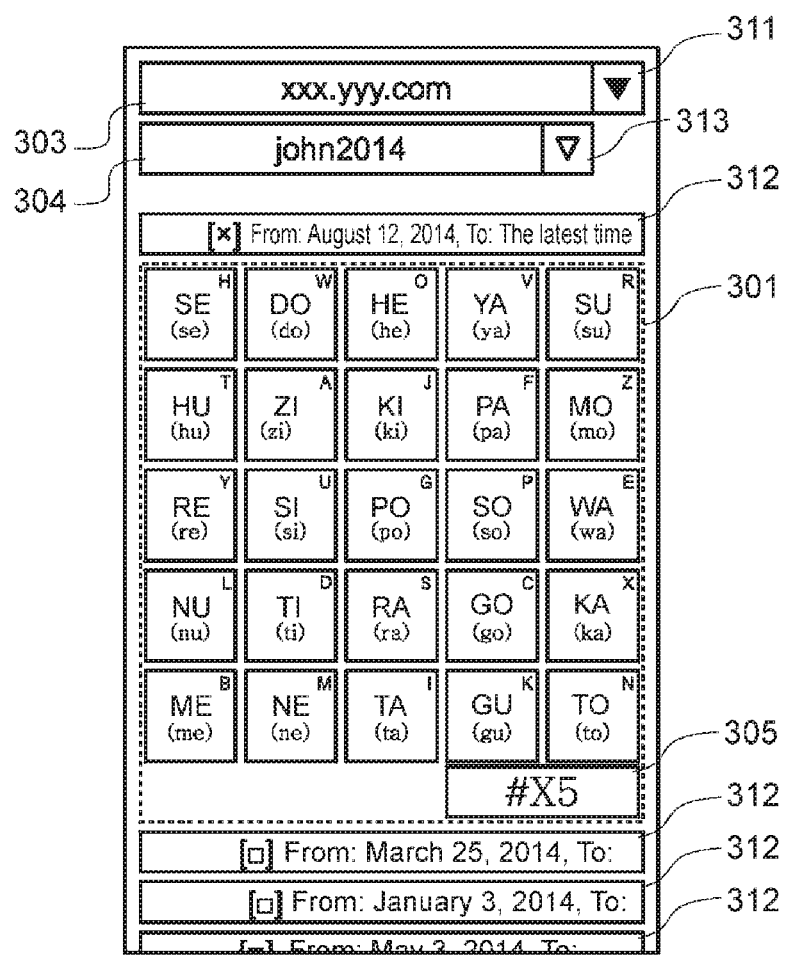
FIG. 3B is an explanatory diagram illustrating how the reminder terminal displays the table according to the embodiment of the present disclosure.

FIG. 3A is an explanatory diagram illustrating how the table is displayed at the reminder terminal according to the embodiment of the present disclosure. FIG. 3B is an explanatory diagram illustrating how the table is displayed at the reminder terminal according to the embodiment of the present disclosure. An explanation will be given below with reference to those figures.

A table 301 stored in the memory 201 in association with the combination of the server name of each resource server 161 with the user name applied to this resource server 161 includes an element arrays with a predetermined number of rows and columns, and as explained above, each element contains the information on the piece of the letter string created at random by the reminder terminal 121.

In the reminder terminal 121, for example, a server ID 303 (in those figures, "xxx.yyy.com" is exemplified and the server ID 303 corresponds to the resource server name) represented by the IP address of the resource server 161, the URL thereof, and the like, and a user name 304 (in those figures, "john2014" is exemplified) to be applied when the user accesses this resource server 161, and an additional element 305 that can be omitted are displayed on the screen together with the table 301. Those pieces of information are stored in the memory 201 in association with each other.

In the following explanation, the explanation will be simplified in order to facilitate the understanding to the present disclosure, and the combination of the resource server name with the user name will be represented as appropriate by the resource server name or the server ID.

In the example case illustrated in those figures, the table 301 includes five rows and five columns. In FIG. 3A, each element in the table 301 contains two uncapitalized alphabets created at random. In FIG. 3B, each element in the table 301 contains a Japanese HIRAGANA letter created at random, and a Roman spelling thereof represented by uncapitalized alphabets. The representation by Roman spelling may be omitted.

As explained in the above outline, according to this embodiment, instead of the master password of conventional technologies, the selection sequence to select each element in the table 301 is adopted.

(Selection Sequence)

Figure 4:
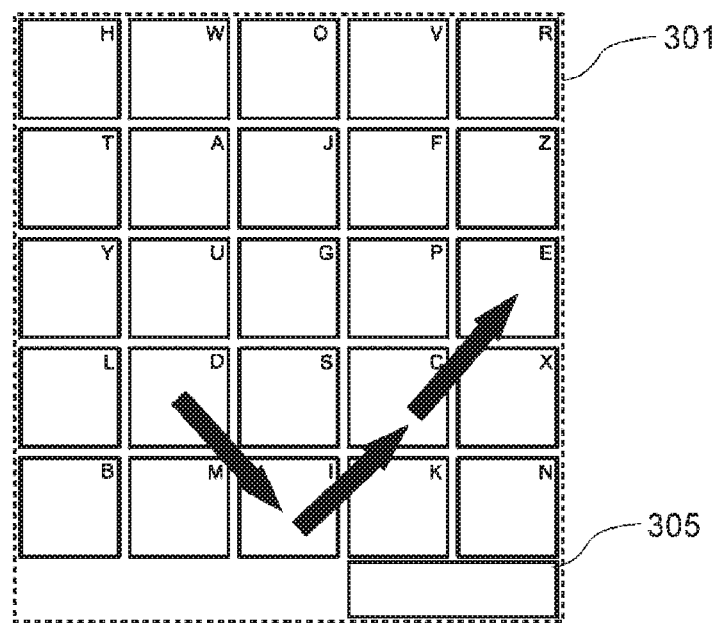
FIG. 4 is an explanatory diagram illustrating an example selection sequence according to the embodiment of the present disclosure.

FIG. 4 is an explanatory diagram illustrating an example selection sequence according to the embodiment of the present disclosure. An explanation will be given below with reference to this figure.

In this figure, the selection sequence to select four elements is illustrated as if a check mark is drawn along thick black arrows at the lower right part of the table 301. According to the selection sequence in this figure, the four elements are extracted in the sequence of the element located at the fourth row and second columns, the element located at the fifth row and third column, the element located at the fourth row and fourth column, and the element located at the third row and fifth column. How many elements and what elements are to be extracted in sequence can be changed as appropriate in view of the required security level, the user proficiency, and the like.

Regarding the example case illustrated in FIG. 3A, when the selection sequence illustrated in FIG. 4 is applied to extract the elements, "bp", "pp", "js", and "ld" are obtained. When those pieces are arranged, "bpppjsld" is accomplished. When there is no additional element 305, this "bpppjsld" becomes the password for the resource server 161 identified by the server ID 303. In the example case illustrated in FIG. 3A, since there is the additional element 305 that is "#X5", "bpppjsld#X5" obtained by coupling the additional element to the tail of "bpppjsld" becomes the password.

In the example case illustrated in FIG. 3A, each element in the table 301 contains the uncapitalized alphabet letter string piece. Depending on the policy applied to the resource server 161, however, the usage of the password containing only uncapitalized alphabet letters may be prohibited.

The additional element 305 is to cope with the restriction for the types of letters applicable as the password. For example, as for the resource server 161 that has a policy for a password such as to contain all of a capitalized alphabet, an uncapitalized alphabet, a number, and a symbol, by preparing the additional element 305 that contains a capitalized alphabet, a number, and a symbol, the password can be easily in full compliance with such a policy. As explained above, the additional element 305 may be omitted.

Regarding the example case illustrated in FIG. 3B, when the selection sequence illustrated in FIG. 4 is applied, the password becomes "TIITAGOWA" in Japanese HIRAGANA. In the case of the resource server 161 that allows Japanese HIRAGANA passwords, such a letter string can be directly entered as the password, but the types of letters applicable as passwords are often limited to alphabets, numbers, and symbols that can be expressed by the ASCII code 32-126. In this case, by arranging the Roman spelling additionally noted to each element, a password "titagowa" is obtainable. In addition, in this figure, since there is the additional element 305 that is "#X5", the password becomes "fitagowa#X5".

Each element in the table 301 is not limited to the uncapitalized alphabet piece of the letter string, and arbitrarily information, such as a capitalized alphabet, an uncapitalized alphabet, a number, and a symbol, is also applicable.

In this embodiment, in order to facilitate the user to memorize the own selection sequence, a guide letter is assigned to the position of each element without any redundancy so as to be in common among all tables 301 managed by the reminder terminal 121. This guide letter can be omitted. In the example cases illustrated in FIG. 3A and FIG. 3B, the guide letter in a small size is displayed at the upper right corner which is a capitalized alphabet.

The guide letter may be always displayed when the table 301 is displayed, or may be displayed in accordance with a user instruction. When, for example, the user gives an instruction by, for example, shaking the reminder terminal 121, the guide letter may be displayed for several seconds to several ten seconds.

In the example cases illustrated in FIG. 3A and FIG. 3B, capitalized alphabets are assigned to a total of 25 elements that are in an array containing five rows and five columns without any redundancy. As for the element located at the fourth row and second column, the element located at the fifth row and third column, the element located at the fourth row and fourth column, and the element located at the third row and fifth column, "D", "I", "C", and "E" are assigned, respectively, and thus the user is capable of initially memorizing the own selection sequence as an English word "DICE".

When the user becomes fluent with the selection sequence, the user is capable of scanning the element within the table 301 in accordance with the own selection sequence by simply viewing the table 301 without a displayed guide letter.

A guide letter string having the guide letters arranged in accordance with the selection sequence assigned to the user is desirably a letter string that can be easy to memorize in some level. When, for example, the user starts utilizing the reminder terminal 121, the reminder terminal 121 presents a plain table to the user, and the user selects the element in the predefined selection sequence. Next, the reminder terminal 121 picks up, from a dictionary at random, a word with a length corresponding to the number of selected elements or causes the user to decide such a word, and allocates the letters contained in the word in sequence to the respective elements to be extracted in accordance with the selection sequence. As for the other elements, other letters may be assigned at random without any redundancy.

In view of the security, different passwords for the respective resource servers which are respective letter strings not described in a dictionary are desirable, but a large number of such passwords is not easy for the user to memorize. Hence, as explained above, according to this configuration, the user memorizes the own selection sequence.

Next, when the table 301 for each resource server 161 is displayed on the screen, the user views this table, extracts the element in accordance with the selection sequence assigned to the user, and arranges the respective contents of the extracted elements and adds the additional element 305 as appropriate, thereby obtaining the password. Since each element in the table 301 is at random, the password to be obtained is a random letter string suitable for the security purpose.

In this configuration, the password for each resource server 161 is divided into pieces which are contained in the respective elements selected from the table 301 based on the user's selection sequence, and such a piece is contained in the additional element 305 as needed. That is, the reminder terminal 121 stores the random secret information in a manner mixed with random dummy information. Accordingly, even if the table 301 displayed on the screen of the reminder terminal 121 is subjected to furtively glance only, no password will be theft. Therefore, a safe management of the random password is enabled.

Note that in the example cases illustrated in FIG. 3A and FIG. 3B, a navigation 311 to select the server name of the resource server 161, a navigation 312 to track the table record, and a navigation 313 to change the user name are displayed. When the user selects the respective navigations 311 and 312 to change the combination of the resource server name with the user name, the displayed information can be changed to information for the other resource server 161, and the user can track the table record applied in past to this resource server 161. Those User Interface (UI) can be changed as appropriate.

In the example case illustrated in this figure, the navigations 311, 313 are each a list box of a display field for the server ID 303, the user name 304, and when the display field is selected, a list of the server IDs registered in the reminder terminal 121 and that of the user names to the corresponding resource server are displayed. The navigation 311 to open the list box is indicated as a black triangle (server ID 303) when there is another candidate, and is indicated as a white triangle (user name 304) when there is no other candidate. The user selects a desired one among those candidates. The navigation 312 has a bar displayed and indicating the applied time period of the table, and when this bar is tapped, clicked, or the like, the display or non-display for the table applied in such a time period is changed. The displayed bar has a cross mark at the forehead part, and the closed bar has a white rectangular mark at the forehead part. In addition, when flicking or dragging is given to the screen, the screen is scrolled, and thus the record that is not displayed in the first view is also made viewable.

The transmitter 203 that is an omittable component transmits, to the external device, information indicating that the table 301 is presented to the user. According to this structure, a necessary condition to allow the user to access the resource server 161 is applicable that is a condition in which the table 301 for such a resource server 161 is presented to the user at the reminder terminal 121. According to this structure, the reminder terminal 121 has a role of managing the password, and also has a function as an authentication token.

The password for each resource server 161, and the selection sequence assigned to the user are updated at an appropriate timing or based on the user's intent. This configuration will be explained later in detail.

(Information Exchange)

Figure 5:
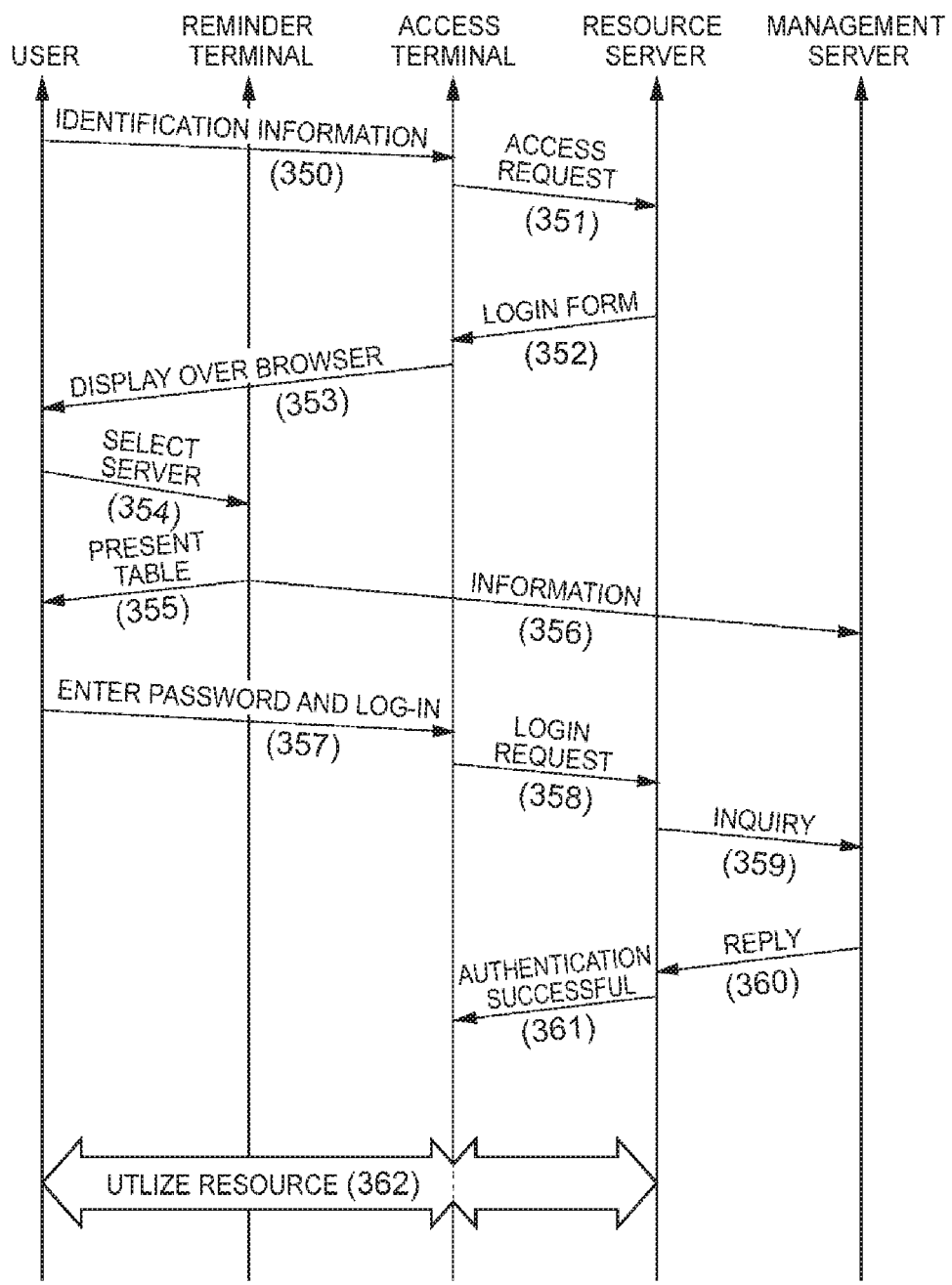
FIG. 5 is an explanatory diagram illustrating how information is exchanged in the authentication system according to the embodiment of the present disclosure.

FIG. 5 is an explanatory diagram illustrating how information is exchanged in the authentication system according to the embodiment of the present disclosure. An explanation will be given below with reference to this figure.

When the user specifies (350) the identification information (for example, URL) of the resource server 161 by the browser, or the like, over the access terminal 141, an access request is transmitted (351) from the access terminal 141 to the resource server 161.

The resource server 161 that has received the access request transmits (352), to the access terminal 141, the login form as a reply to the access request.

The login form received by the access terminal 141 is displayed (353) over the browser, or the like, of the access terminal 141.

Figure 6:
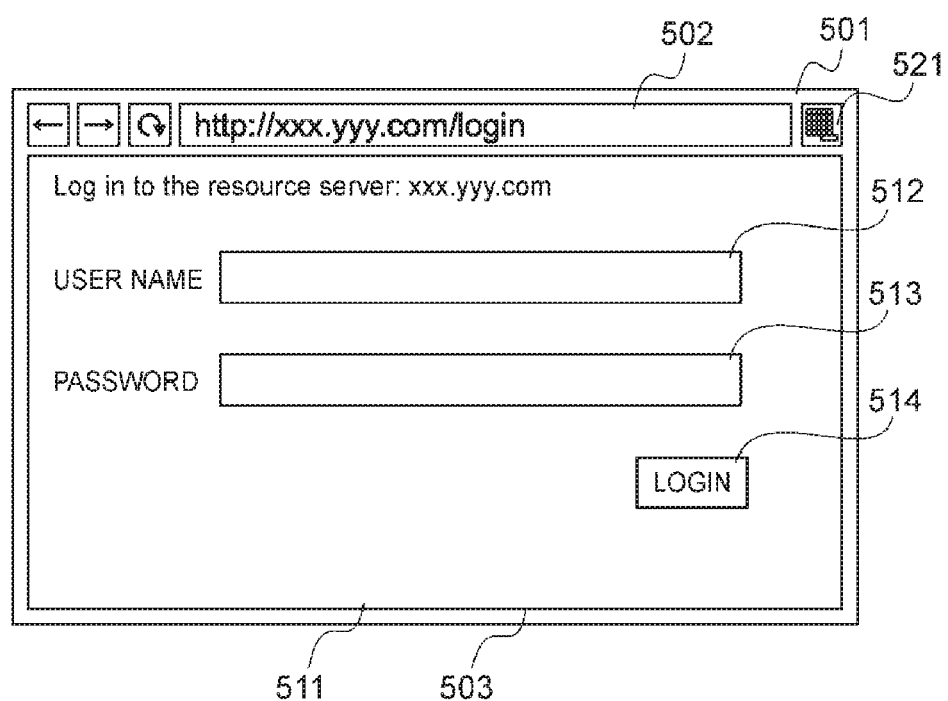
FIG. 6 is an explanatory diagram illustrating how a browser displays a login form according to the embodiment of the present disclosure.

FIG. 6 is an explanatory diagram illustrating how the browser displays the login form. An explanation will be given below with reference to this figure. A browser 501 of the access terminal 141 displays the URL of the resource server 161 in a URL field 502, and a login form 511 is displayed in a contents field 503. The login form 511 contains a user name field 512, a password field 513, and a login button 514. In addition, a plug-in icon 521 to execute a plug-in process installed in the browser 501 is also displayed.

In this case, in order to obtain the password for the resource server 161, the user launches a reminder application on the mobile terminal, or the like. In this case, this mobile terminal, or the like, starts functioning as the reminder terminal 121. This reminder terminal 121 presents (355), on the screen of the reminder terminal 121 based on the user's selection (354), the table 301, or the like, associated with the combination of the server name of the resource server 161 with the user name.

Next, the reminder terminal 121 transmits (356), to the management server 181, the information indicating that the table 301, or the like, is presented to the user. The management server 181 sets, for the combination of the resource server name with the user name relating to this information, the validated time period covering the time point at which this information is received. An example validated time period is "within five minutes after the information is received".

The user enters the own user name in the user name field 512 in the login form 511, and vies the table 301, or the like, displayed on the reminder terminal 121 to obtain pieces of the authentication letter string based on the own selection sequence. Next, the user enters the obtained authentication letter string in the password field 513 of the login form 511, and clicks or taps (357) the login button 514.

In this case, the login request together with the user name and the password is transmitted (358) from the access terminal 141 to the resource server 161.

The resource server 161 that has received the login request executes a legitimate authentication based on the user name and the password, and when the legitimate authentication is successful, the resource server 161 inquires (359) the management server 181 as for whether or not the present date and hour satisfies the allowance condition with respect to the user and the resource server 161.

In this case, as explained above, when the allowance condition in which "the inquiry is received by the management server within the validated time period set for the combination of the resource server and the user name relating to the inquiry" is adopted, a determination can be made on whether or not the user has the reminder terminal 121 that serves as a security token. The management server 181 replies (360) for the inquiry to the resource server 161.

When the allowance condition is satisfied, a determination is made that such a user has an authority to utilize the resource of the resource server 161 under such a user name, and the resource server 161 transmits (361), to the access terminal 141, information indicating the successful authentication, and the user starts utilizing (362) the resource of the resource server 161 via the access terminal 141.

When there is a reply that the allowance condition is not satisfied, or when the legitimate authentication based on the user name and the password is unsuccessful, the resource server 161 transmits, to the access terminal 141, information indicating that the present date and hour is out of the validated time period. In addition, in the former case, the user is requested to activate the reminder terminal 121. In this case, after activating the reminder terminal 121, the user attempts to log-in again (unillustrated) via the login form 511 displayed on the access terminal 141.

When the legitimate authentication based on the user name and the password is unsuccessful, the resource server 161 transmits, to the access terminal 141, information indicating that the authentication is unsuccessful. The user enters again the user name or the password from the login form 511 displayed on the access terminal 141, and needs to attempt to log-in again (unillustrated).

The inquiry and reply with respect to the allowance condition may be made prior to the legitimate authentication by the resource server 161 based on the user name and the password. When the satisfied allowance condition is adopted as the preliminary authentication, as will be explained later, no password entry via the access terminal 141 may be enabled unless the preliminary authentication is successful.

In the above explanation, the resource server 161 inquiries the management server 181 as for whether or not the allowance condition "the present date and hour is within the validated time period set for the user and the resource server 161" is satisfied, the validated time period itself may be inquired. In this case, the management server 181 replies that there is no validated time period recently or no validated time period is set recently. In addition, the resource server 161 may inquire the management server 181 as for the receiving date and hour of the information. In this case, the management server 181 replies the receiving date and hour of the information received most recently or replies that no information is received recently, and the resource server 161 sets the validated time period for the user.

As explained above, in this configuration, although the reminder terminal 121 is utilized as a security token, this function may be omitted. In this case, the decision and determination on the validated time period are omitted, and the resource server 161 executes the legitimate authentication based on the user name and the password only.

(Script Utilization)

In the login form 511 displayed over the browser 501, or the like, of the access terminal 141, the following structure may be employed using a script by AJAX, or the like, that is a non-synchronous XML communication technology based on JavaScript (Registered Trademark).

That is:

(1) every time a letter is entered in the user name field 512, the script causes the access terminal 141 to inquire the resource server 161 or the management server 181 as for whether or not the present date and hour is within the validated time period set for the user who has the user name that is a letter string already entered in the user name field 512;

(2) the inquiry destination replies to the inquiry from the access terminal 141. When the inquiry destination is the resource server 161, the resource server 161 inquires the management server 181 as for the validated time period as appropriate, and replies to the access terminal 141 based on the details of such an inquiry;

(3a) when the present date and hour is within the validated time period, the script sets the password field 513 to be editable and viewable;

(3b) when the present date and hour is out of the validated time period, the script sets the password field 513 to be not editable and not viewable; and (4) the script sets the login button 514 to be unavailable or not viewable until the letter string is entered in the password field 513, and sets the login button 514 to be available and viewable after the letter string is entered.

According to this configuration, unless the user has the activated reminder terminal 121, the user is not capable of entering the password. Hence, an unauthorized access by a third person is effectively preventable.

(Reminder Terminal Automatic Activation)

In the above explanation, the user who attempts to access the resource server 161 spontaneously activates the reminder terminal 121, but the reminder terminal 121 can be easily activated by utilizing the plug-in function of the browser 501 activated over the access terminal 141, and the notification receiving function of the mobile terminal, or the like.

That is, the plug-in of the browser 501 monitors whether or not the contents at the displayed URL contain a field to enter a letter in a hidden manner. This field can be identified based on, for example, whether or not the contents contains an element represented by a <input type="password"> tag in a HyperText Markup Language (HTML).

When such a field is contained, the plug-in automatically, or upon a clicking or the like of the plug-in icon 512 by the user, executes a process to send a notification to the mobile terminal that accomplishes the reminder terminal 121. Typically, the following process is executed.

The plug-in transmits, to a notification server provided by a vendor, or the like, that provides an Operating System (OS) for the mobile terminal, or the like, a request that designates a notification destination user, a destination application, and notification details. Note that the plug-in may give a request to the management server 181, and the management server 181 that has received the request may access the notification server. In addition, the information on the destination user associated with the mobile terminal, or the like, may be set by the user at the time of installation of the plug-in.

The notification server that has received the request identifies the mobile terminal, or the like, of the destination user designated in the request, and notifies the application of such a mobile terminal, or the like, of the designated notification details.

The mobile terminal, or the like, that has received the notification displays the notification details in a pop-out manner or may collectively display on a notification center, or the like. When the user taps, or the like, the notification details and selects such details, the application relating to the notification is launched, and the process in accordance with the notification details starts.

The notification details contain the contents URL displayed over the browser. Hence, when the table 301 associated with the server ID that matches the URL is already registered, the reminder terminal 121 presents this table to the user. The simplest scheme to determine the matching of the URL is to determine whether or not the domain name indicated in the URL is consistent with the domain name utilized as the server ID, but the matching may be determined based on, for example, whether or not the entire URL matches or a part of the URL other than the option parameter matches.

When such a table is not registered yet, the reminder terminal 121 may give an alert indicating that the table is not registered yet, or may request the user to register the table 301 for the resource server 161. The process of requesting the registration will be explained later in detail.

When the above configurations are combined, and when the login form 511 for the desired resource server 161 is displayed over the browser, the table 301 corresponding to the desired resource server 161 is automatically or manually displayed at the reminder terminal 121. When the reminder terminal 121 is unable to display the table 301 because of the absence of the registration of the resource server 161, the user can know this fact, and becomes unable to enter a letter string in the password field 513 and depresses the login button 514. Hence, for example, a log-in to a counterfeit site is efficiently preventable.

As will be explained later, when the user registers, at the reminder terminal 121, the table 301 containing the present password for the resource server 161 in the reminder terminal 121 and when the user updates the password for the resource server 161 and gives an instruction to start a password management at the reminder terminal 121, information to that effect is given from the reminder terminal 121, and an entry to the password field 513 is enabled, and the login button 514 becomes available.

In addition, as for the notification to the mobile terminal, a short-range communication to be explained below will be available without via the notification server. That is, the plug-in of the browser 501 activated over the access terminal 141 performs a short-range communication with the mobile terminal, or the like, to give a trigger to launch the program at the mobile terminal, or the like, as needed, and the mobile terminal, or the like, starts serving as the reminder terminal 121.

(Password Entry by Short-Range Communication)

When the reminder terminal 121 and the access terminal 141 are located at the nearby locations to each other, and a communication is available, a structure can be also employed in which the user not manually enters the authentication letter string but simply selects the elements in sequence from the table presented at the reminder terminal 121, thereby causing the user name field 512 in the login form 511 displayed at the access terminal 141 and the password field 513 thereof to be filled with the user name and the authentication letter string, respectively.

First, the plug-in is being activated over the access terminal 141. This plug-in is a program that provides an extended function to the browser, or a resident program that monitors the action of the browser.

The plug-in always, intermittently, or based on the user instruction like clicking of the plug-in icon 521, monitors whether or not there is the reminder terminal 121 capable of performing a short-range communication and located at the nearby location to the access terminal 141. An example short-range communication in this case is a wired connection or a wireless connection established within a predetermined distance. When, for example, the access terminal 141 and the reminder terminal 121 are wirelessly connected to the common WiFi access point, or when the access terminal 141 and the reminder terminal 121 are wirelessly communicable with each other by Bluetooth®, NFC, or the like, or when the access terminal 141 and the reminder terminal 121 are directly connected with other via a USB cable, or the like, a determination is made that a short-range communication is available.

When the reminder terminal 121 presents the table to the user, this reminder terminal transmits an information to that effect to the access terminal 141 that has established the short-range communication.

The plug-in of the access terminal 141 that has received the information determines whether or not the URL of the login form 511 displayed over the browser of the access terminal 141 matches the resource server name relating to the information, and transmits the determination result to the reminder terminal 121. When matched, the plug-in of the access terminal 141 enters the user name relating to the information in the user name field 512 in the login form 511.

Based on the received result from the access terminal 141, when the table for the login form 511 displayed over the browser of the access terminal 141 is presented to the user at the reminder terminal 121, every time the user gives a selection to each element in this table or the additional element 305 therein (for example, every time the user taps or clicks the element in the table), the reminder terminal 121 sends, to the access terminal 141, the letter string piece contained in the selected element.

The plug-in of the access terminal 141 enters the sent letter string from the reminder terminal 121 in the password field 513 of the login form 511. Hence, the reminder terminal 121 serves as a special keyboard for the access terminal 141.

When the element selection based on the own selection sequence completes, the user depresses the login button 514 in the login form 511 at the access terminal 141.

In this configuration, the user does not need to view the table and to extract the random letter string, and does not need to directly enter the authentication letter string in the password field 513 in the login form 511. Hence, while the short-range communication is being established between the reminder terminal 121 and the access terminal 141, a display of a button, a label, and the like, that enables a selection of each element in the table 301 and the additional element 305 therein sufficiently eliminates the necessity to display the letter string contained in such an element. In this case, the guide letter may be displayed in a manner so as to facilitate the checking of the position of the grid for each element in the table 301, or the display of the guide letter may be omitted.

In order to display the letter string piece contained in each element in the table 301 and in the additional element 305 therein at the reminder terminal 121, a supplemental authentication (for example, an authentication based on a passcode implemented in the OS of a mobile phone, or the like, constructing the reminder terminal 121, and a fingerprint authentication) prepared individually for the predetermined reminder terminal 121 may be further requested.

In addition, while the short-range communication is being established with the plug-in of the access terminal 141, the reminder terminal 121 may display the table 301, but when the short-range communication is discontinued, no table 301 may be displayed unless the supplemental authentication is successful at the reminder terminal 121.

According to this configuration, even if the reminder terminal 121 is theft, a direct theft of the table is made difficult.

According to the configuration in which the short-range communication between the access terminal 141 and the reminder terminal 121 is utilized, and the reminder terminal 121 is caused to server as a special keyboard, components relating to the management server 181 may be omitted from the authentication system 101.

As explained above, according to those configurations, a large number of random passwords not easy for a human person to memorize are safely managed at the reminder terminal 121.

In addition, when the presentation of the table in which the divided password pieces are embedded in other elements in a mixed manner to the user at the reminder terminal 121 is adopted as a requisition for the preliminary authentication for the determination on the password itself, a Brute-force attack relating to the password can be effectively prevented.

Still further, by not enabling the user to enter the password, and the like, until the table is presented to the user at the reminder terminal 121, the user can confirm that the reminder terminal 121 is serving as the authentication token.

Yet still further, application of a combination of the plug-in of the browser, or the like, over the access terminal 141 with the reminder terminal 121 effectively prevents an accident like a URL spoofing.

(Modified Examples)

In the above configuration, the access request is sent from the access terminal 141 to the resource server 161, and the login form 511 is sent from the resource server 161 to the access terminal 141, and the user enters the password to the access terminal 141. However, the password may be entered from the other authentication terminal than the access terminal 141. The authentication terminal may be common to the reminder terminal 121, or may be a different device.

When, for example, the access request is sent to the resource server 161 from the access terminal 141, the resource server 161 identifies an authentication terminal like the smartphone assigned to the user name beforehand which is designated in the access request, and sends a notification to the application to be activated over such an authentication terminal. In addition, the browser of the access terminal 141 displays a screen indicating an awaiting for the authentication.

When the user responses to the notification at the authentication terminal, the application is launched at the authentication terminal, and the login form 511 is displayed. When the user enters the password, and the like, in the login form 511 at the authentication terminal, those pieces of information are sent to the resource server 161, and thus the login authentication is executed. When the authentication is successful, the browser of the access terminal 141 transitions the displayed screen from the screen awaiting for the authentication to a screen for an access table. Next, the user becomes able to utilize the resource of the resource server 161 via the access terminal 141.

As explained above, according to this configuration, the authentication terminal and the reminder terminal 121 are accomplished on the single terminal. That is, when a notification relating to the access request is sent to the reminder terminal 121, the registered user name for the resource server 161, the table 301 associated with the resource server 161, and the entry field to enter the password are displayed on the screen.

The user enters the password in the entry field while viewing the table 301 at the reminder terminal 121. When the password entry completes, the user name and the password are sent from the reminder terminal 121 to the resource server 161. When the authentication at the resource server 161 is successful, the user becomes able to utilize the resource of the resource server 161 via the access terminal 141.

When a browser plug-in is applied, the following configuration is also applicable. That is, upon a display of the login form 511 at the access terminal 141, when the plug-in is activated, a notification is sent to the reminder terminal 121.

When the user responds to this notification, the registered user name for the resource server 161, the table 301 associated with this resource server 161, and the entry field to enter the password are displayed on the screen of the reminder terminal 121.

The user who is viewing the table 301 enters the password in the entry field. When the password entry completes, the user name and the password are sent to the browser plug-in of the access terminal 141.

The browser plug-in enters the received user name and password in the login form 511, and actuates the login button 514 (the user may depress this button). This causes the access terminal 141 to transmit the login request to the resource server 161. The following actions are the same as those explained above.

In this configuration, even if the resource server 161 is providing the service without a presumption that there are the reminder terminal 121 and the management server 181, by simply applying the browser plug-in to the access terminal 141, the password management utilizing the reminder terminal 121 is enabled.

Note that as for the authentication for the user name and the password, an embodiment in which the resource server 161 outsources this authentication to the management server 181 can be employed. In this case, the user name and the password are transmitted to the management server 181 as appropriate, and the resource server 161 inquires the management server 181 as for the success or failure of the authentication.

(Utilization of Already-Existing Password)

In the above embodiment, each element in the table 301 registered at the reminder terminal 121 is based on the presumption such that a letter string contained therein is created at random, but when the already-existing resource server 161 is to be registered in the reminder terminal 121 without a change in password, for example, the following procedure may be applied.

That is:

(1) the reminder terminal 121 presents a plain table to the user;

(2) the user divides the own password for the already-existing resource server 161 into pieces, and manually writes the divided pieces in the plain table in accordance with the own selection sequence;

(3) when filling of the divided password pieces completes, the reminder terminal 121 embeds letter string pieces created at random in other elements; and (4) the finished table is stored in the memory 201 of the reminder terminal 121 in association with the server ID of the already-existing resource server 161.

According to this procedure, even if there is the resource server 161 that has already set password, the password management can be performed at the reminder terminal 121 without a change in password. According to this configuration, by omitting the authentication via the management server 181 based on the allowance condition, the system can be compatible with the given resource server 161.

In this case, the reminder terminal 121 may examine whether or not the finished table is sufficiently at random.

When the random nature is not high enough, a password change by the user is desirable. In addition, upon completion of the writing of the divided password pieces by the user, the element in which the divided piece is written may be compared with the element in the other table at the same portion and already registered in the reminder terminal 121. When the element has a redundancy, a prompt to change the password is desirably given to the user.

(Password Registration and Update)

When the password management for the resource server 161 starts at the reminder terminal 121 from the beginning, a creation of a new table corresponding to the combination of the resource server name of the resource server 161 with the user name, and a registration of a password that is the registration letter string obtained from such a table in the resource server 161 are necessary.

In addition, once the password management for the resource server 161 starts at the reminder terminal 121, a periodical password change is desirable. According to conventional technologies, although an alert to change the password is given when a certain time period (for example, 90 days) has elapsed from the last update of password at the time of server log-in, a reconsideration of a new password is necessary when the password is to be changed.

Hence, in this configuration, the reminder terminal 121 assists the password registration and update.

That is, the table creator 501 of the reminder terminal 121 creates, in the case of a new registration for each combination of the resource server name with the user name, or in the case in which, after the table is stored in the memory 201 since such a combination is already registered, when an update time period associated with such a combination elapses, the new table.

A typical update time period is until a certain time period elapses after the last creation of the table, but a time period at which the update should be made may be set in accordance with, for example, the presentation frequency of the table.

In the new table, also, the information contained in each element is created at random. In addition, the additional element may be specified by the user, or information on the same letter type as that of the presently applied table may be created at random, or the present additional element may be continuously applied.

When the element is extracted in the selection sequence assigned to the user, and the additional element is added as needed, the registration letter string for the resource server 161 is obtained.

In addition, in the case of the new registration, the password register 205 presents the created table, and in the case of the updating registration, the password register 205 presents the present table for the resource server 161 and the new table for such a server, and prompts the user to newly register the password or to register the updated password.

Figure 7:
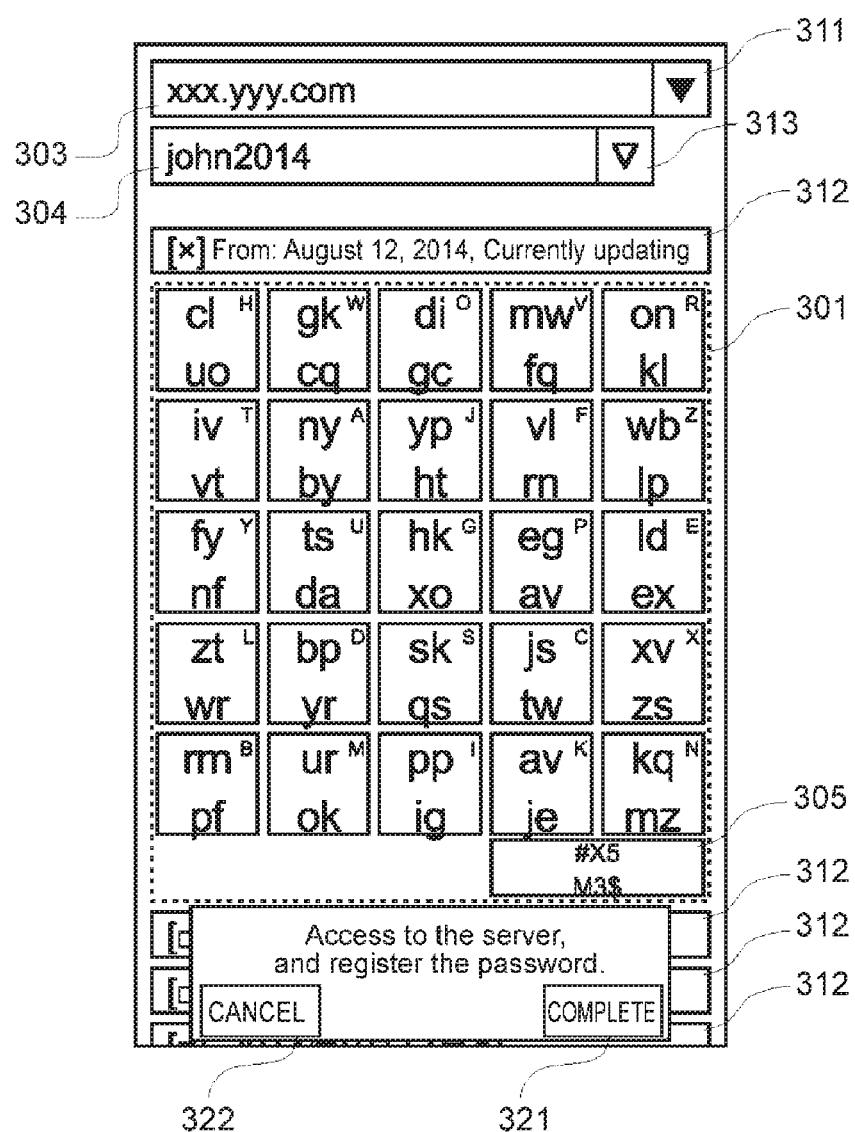
FIG. 7 is an explanatory diagram illustrating how a table for updating a password is displayed according to the embodiment of the present disclosure.

FIG. 7 is an explanatory diagram illustrating how the table for updating the password is displayed according to the embodiment of the present disclosure. An explanation will be given below with reference to the figures.

As for the password updating for the resource server 161, entry of both the presently applied password and the new password is often requested. A structure that enables the user to review the record of tables applied for each resource server 161 at the reminder terminal 121 is desirable. When the old and new tables are simultaneously viewable at the time of password updating, a necessary time for the user can be reduced.

This figure illustrates an example display scheme by the reminder terminal for updating the password based on the table illustrated in FIG. 3A, and as for each element in the table 301 and for the additional element 305, the present element is indicated at the upper side, while the new element is indicated at the lower side.

In the case of the new registration, since there is no "present element", only the new element may be displayed.

In addition, at the resource server 161, when the user manually registers the new password or completes the registration of the updated password, and when the user clicks or taps a completion button 321, the table register 206 stores the new table in the memory 201 in association with the resource server 161. In addition, in the case of the updated password registration, the previous table is stored as record information. In this case, the managed information on the table by the reminder terminal 121 may be subjected to an encryption and back-up process at the management server 181. When a cancel button 322 is clicked or tapped, the update process is canceled.

In the above explanation, the user manually updates the password, but when the user's selection sequence itself is managed by the reminder terminal 121 or the management server 181, and can be referred as needed, the password can be periodically and automatically updated by an access from the reminder terminal 121 or the management server 181 to the resource server 161.

A configuration may be also employed in which, when the password is to be updated, and when the reminder terminal 121 causes the user to tap the table 301 illustrated in FIG. 7 in the user's selection sequence, both of the new and old passwords are obtained, and the reminder terminal 121 accesses the resource server 161 using the obtained new and old passwords, thereby automatically updating the password.

In this case, since the obtained selection sequence, new and old passwords are temporarily stored in the Random Access Memory (RAM) of the reminder terminal 121, the area for temporarily storing such pieces of information is desirably erased after the password is updated.

According to this configuration, a random letter string that is not described in a dictionary is applicable as the password for the resource server 161, facilitating the periodical update of the password.

(Selection Sequence Update)

According to this embodiment, not only the individual password for each resource server is updatable but also the selection sequence assigned to the user is updatable. This corresponds to an update of a master password in conventional technologies.

First, when the user attempts to update the selection sequence, the reminder terminal 121 creates a new guide letter string for this user. In the above example, the table 301 includes the five rows and five columns, and a single capitalized alphabet guide letter is assigned to each element. In this embodiment, a selection sequence of selecting the four elements in the table 301 is adopted. Hence, the new guide letter string for the user that contains four capitalized alphabets not redundant with each other is to be created.

The guide letter string should be desirably changed every time the selection sequence is updated. For example, the guide letter string may be created at random. A spelling easy to memorize may be adopted using a dictionary, or the like. For example, a word containing four letters (for example, "SNOW" or "MAZE") may be adopted, or the forehead part of a word including equal to or greater than five letters (for example, the forehead part "TABL" of "TABLE", or the forehead part "SCHO" of "SCHOOL") may be adopted.

Several spelling candidates that are easy to memorize as explained above may be presented to the user at random, and the user may select one of those. In addition, a configuration is also applicable in which, every time the selection sequence is updated, the user is caused to consider a guide letter string. In the following explanation, in order to facilitate understanding, an explanation will be given of an example case in which the new guide letter string "SCHO" is created.

Figure 8A:
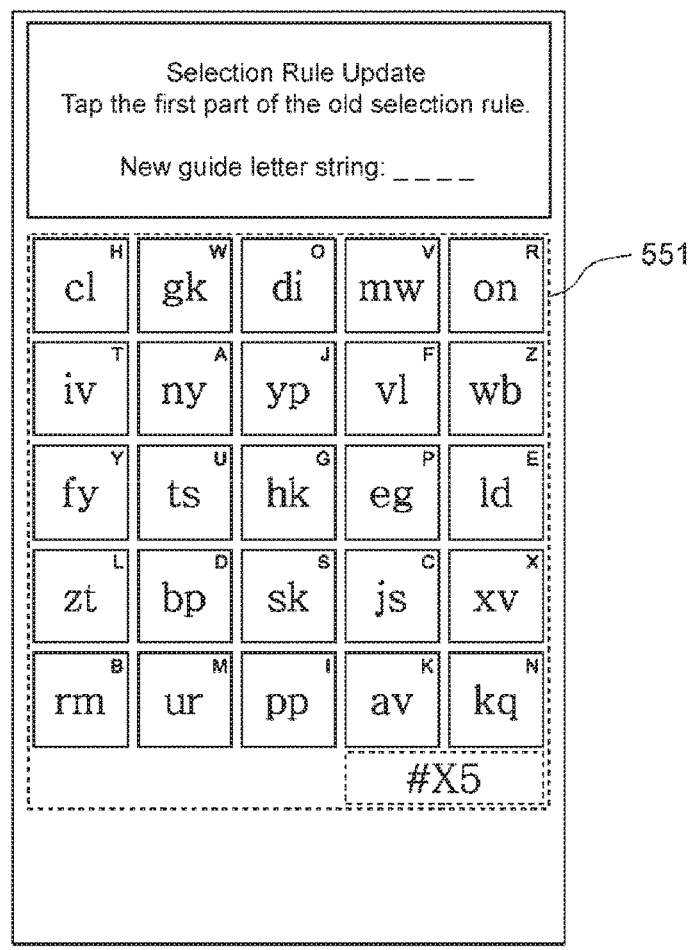
FIG. 8A is an explanatory diagram illustrating how a user selects the selection sequence that has been applied so far.

Next, the acceptor 207 of the reminder terminal 121 presents, to the user, a sample table that has the same number of rows and columns as those of the table for each resource server 161 managed by the reminder terminal 121. FIG. 8A is an explanatory diagram illustrating how the user selects the selection sequence that has been applied so far. An explanation will be given below with reference to this figure.

In the example case illustrated in this figure, a sample table 551 includes five rows and five columns, and each element contains the same information as that of the element in the table for the resource server 161 applied last time, and is indicated for the reference purpose.

In addition, as illustrated in this figure, the acceptor 207 of the reminder terminal 121 requests the user to tap or click the element in the sample table 551 in accordance with the assigned selection sequence to the user. In the following example, an explanation will be given of an example case in which the user presently applies the selection sequence (fourth row and second column, fifth row and third column, fourth row and fourth column, and third row and fifth column) illustrated in FIG. 4.

Figure 8B:
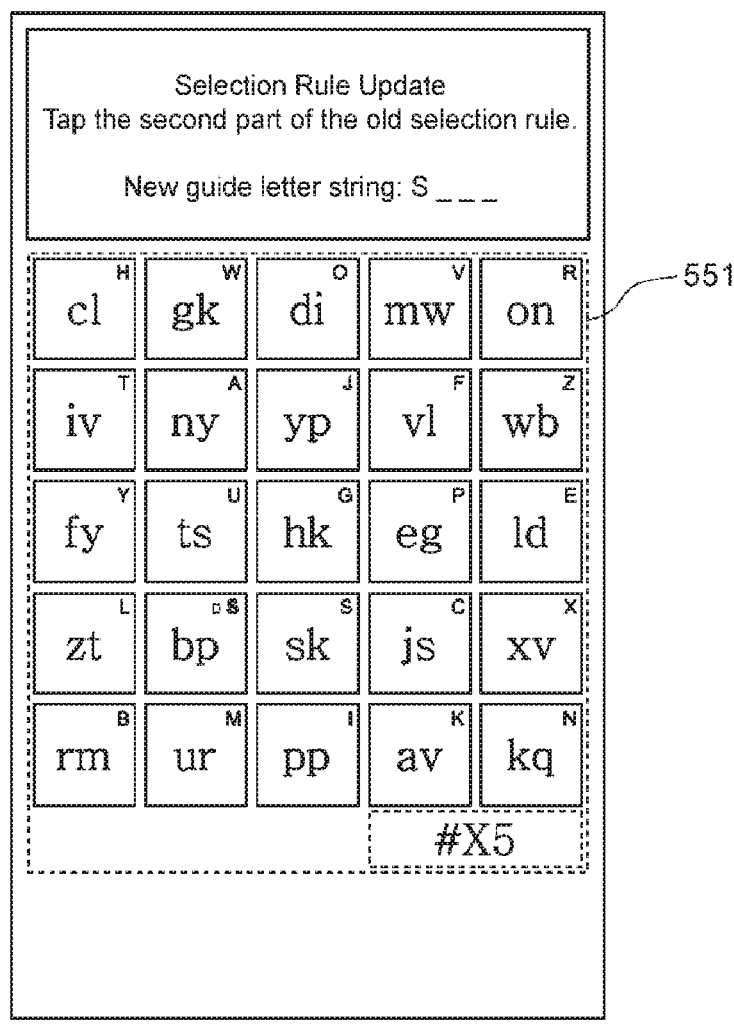
FIG. 8B is an explanatory diagram illustrating how the user selects the selection sequence that has been applied so far.

FIG. 8B is an explanatory diagram illustrating how the user selects the selection sequence that has been applied so far. As illustrated in this figure, when the user selects the first element (at the fourth row and second column) in the sample table 551, the first letter "S" of the newly created guide letter string is added to the guide letter in the element.

Figure 8C:
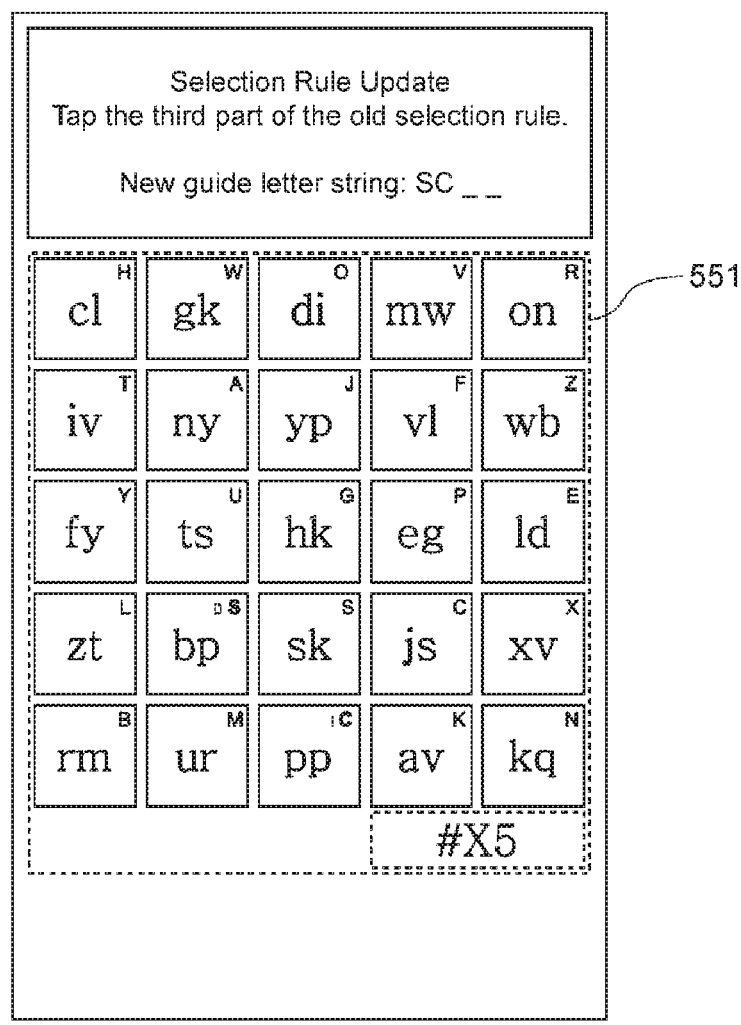
FIG. 8C is an explanatory diagram illustrating how the user selects the selection sequence that has been applied so far.

FIG. 8C is an explanatory diagram illustrating how the user selects the selection sequence that has been applied so far. As illustrated in this figure, when the user selects the second element (at the fifth row and third column) in the sample table 551, the first letter "C" of the newly created guide letter string is added to the guide letter in the element.

Figure 8D:
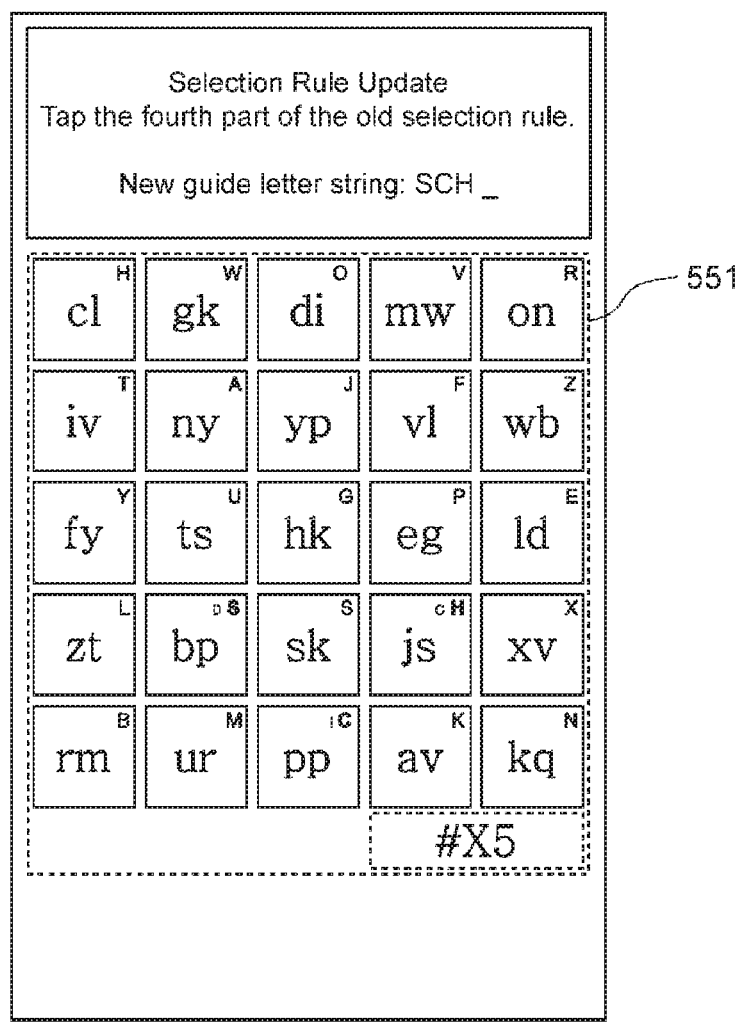
FIG. 8D is an explanatory diagram illustrating how the user selects the selection sequence that has been applied so far.

FIG. 8D is an explanatory diagram illustrating how the user selects the selection sequence that has been applied so far. As illustrated in this figure, when the user selects the third element (at fourth row and fourth column) in the sample table 551, the first letter "H" of the newly created guide letter string is added to the guide letter in the element.

Figure 8E:
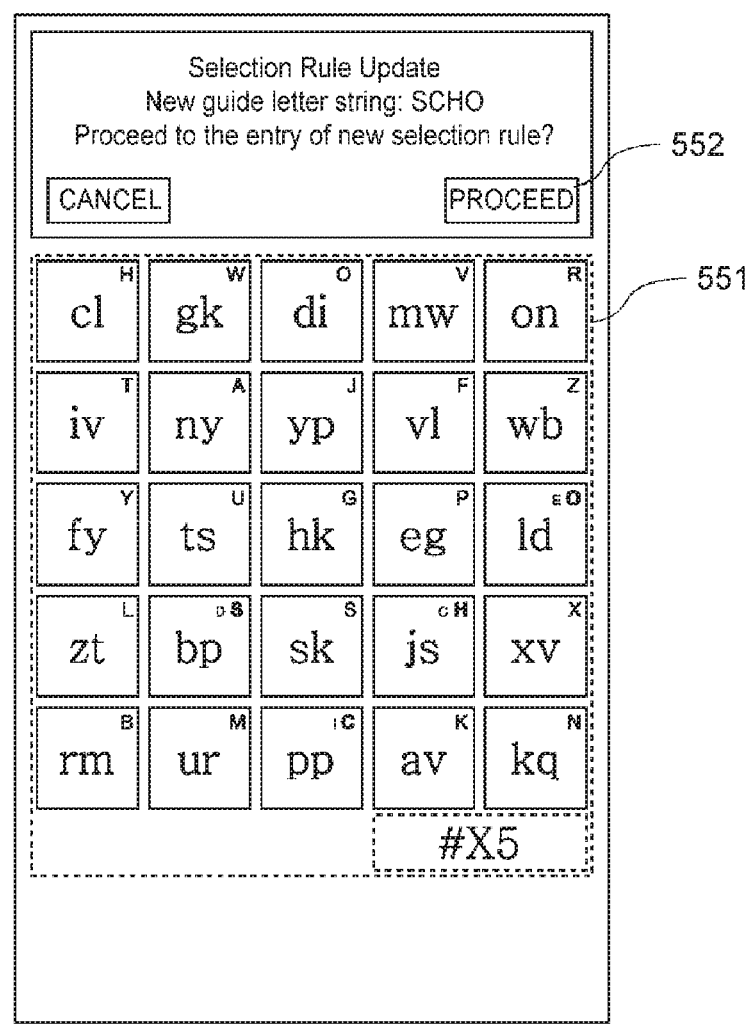
FIG. 8E is an explanatory diagram illustrating how the user selects the selection sequence that has been applied so far.

FIG. 8E is an explanatory diagram illustrating how the user selects the selection sequence that has been applied so far. An explanation will be given below with reference to those figures. As illustrated in this figure, when the user selects the fourth element (at third row and fifth column) in the sample table 551, the first letter "O" of the newly created guide letter string is added to the guide letter in the element.

When the element in the sample table 551 is selected in accordance with the present selection sequence, every time the element is selected, the letter in accordance with the sequence of the element among the newly created guide letter string is indicated apparently within the selected element. This enables the user to know that the new guide letter string prepared for the new selection sequence is "SCHO".

When the entry of the present selection sequence completes, and the user taps or clicks a proceed button 552, the acceptor 207 presents, to the user, a transition table that has the same number of rows and columns as those of the sample table 551. FIG. 9A is an explanatory diagram illustrating how the user selects the new selection sequence. As illustrated in this figure, the acceptor 207 displays, on the screen of the reminder terminal 121, a transition table 561.

The transition table 561 is a plain table that includes five rows and five columns, and the reminder terminal 121 requests the user to tap or click, and the like, to select the element in the transition table 561 in the selection sequence that is newly applied by the user.

Figure 9B:
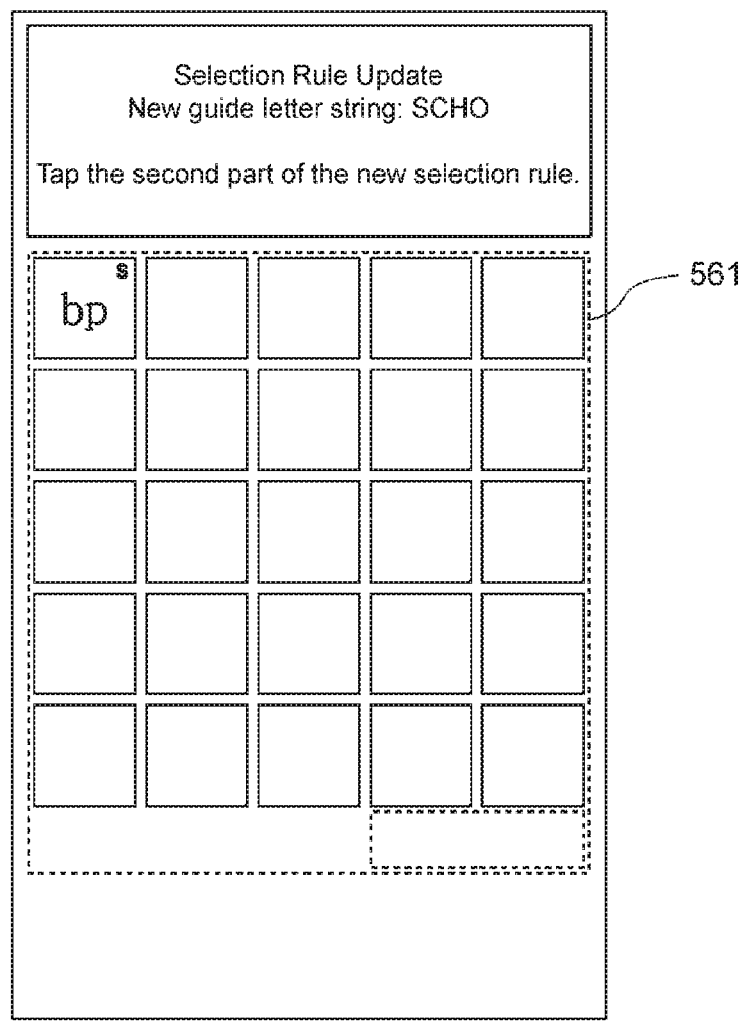
FIG. 9B is an explanatory diagram illustrating how the user selects the first part of the new selection sequence.
Figure 9C:
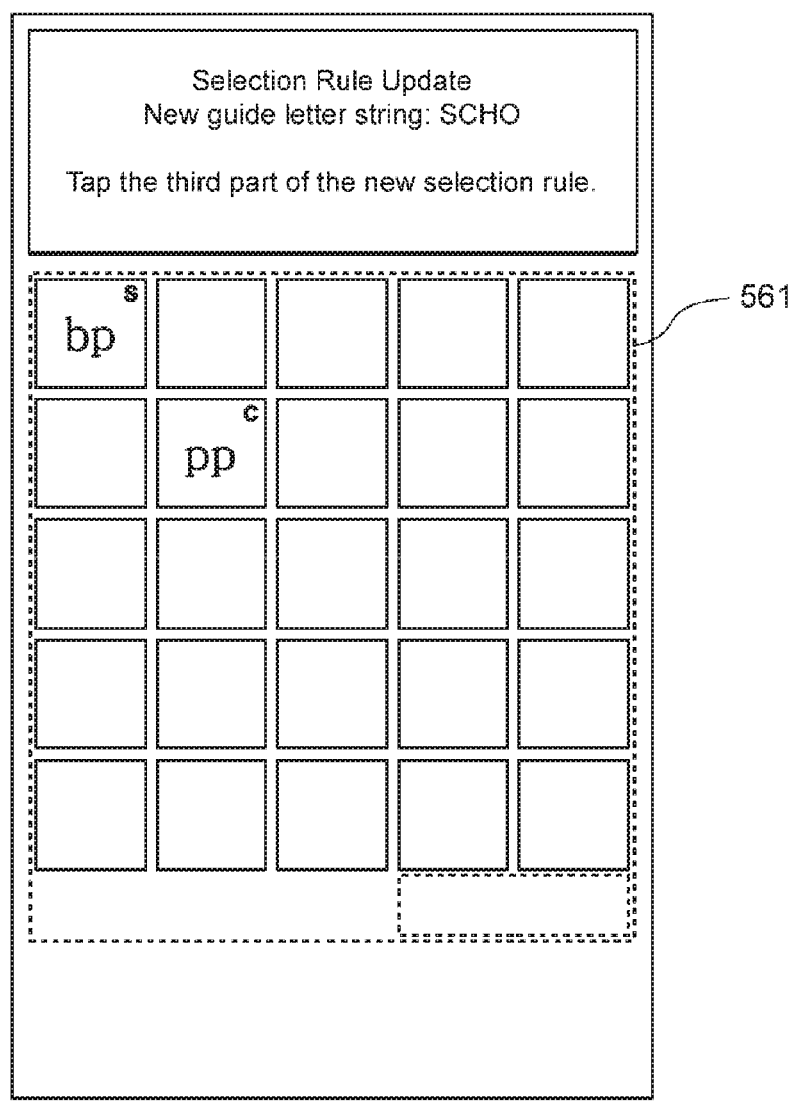
FIG. 9C is an explanatory diagram illustrating how the user selects the second part of the new selection sequence.
Figure 9D:
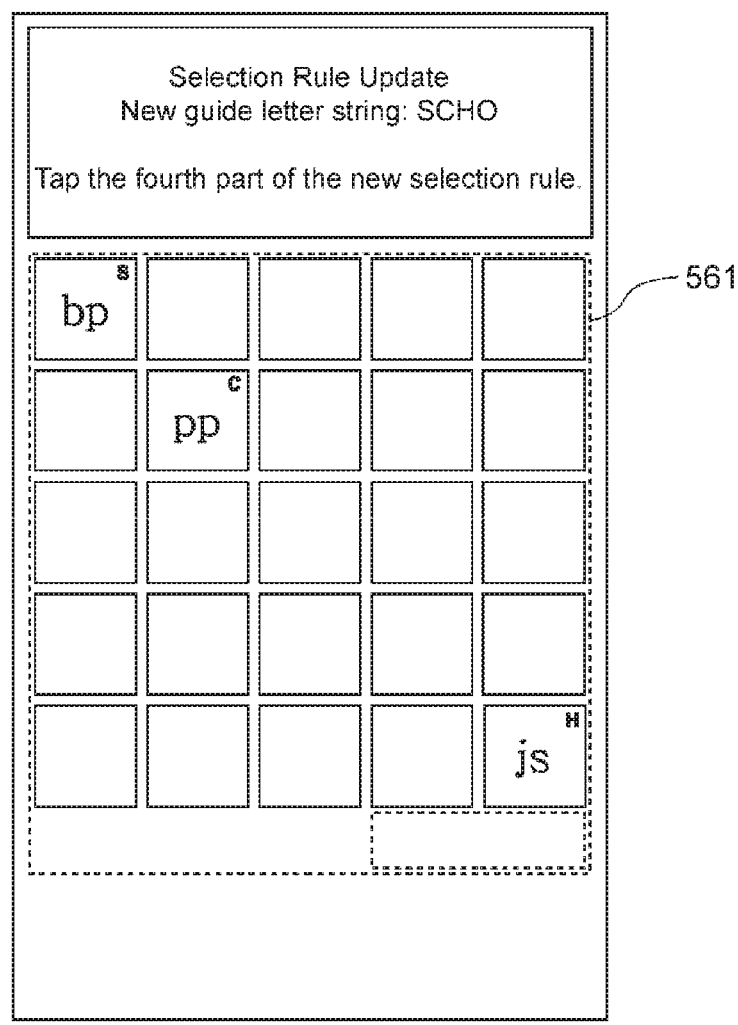
FIG. 9D is an explanatory diagram illustrating how the user selects the third part the new selection sequence.
Figure 9E:
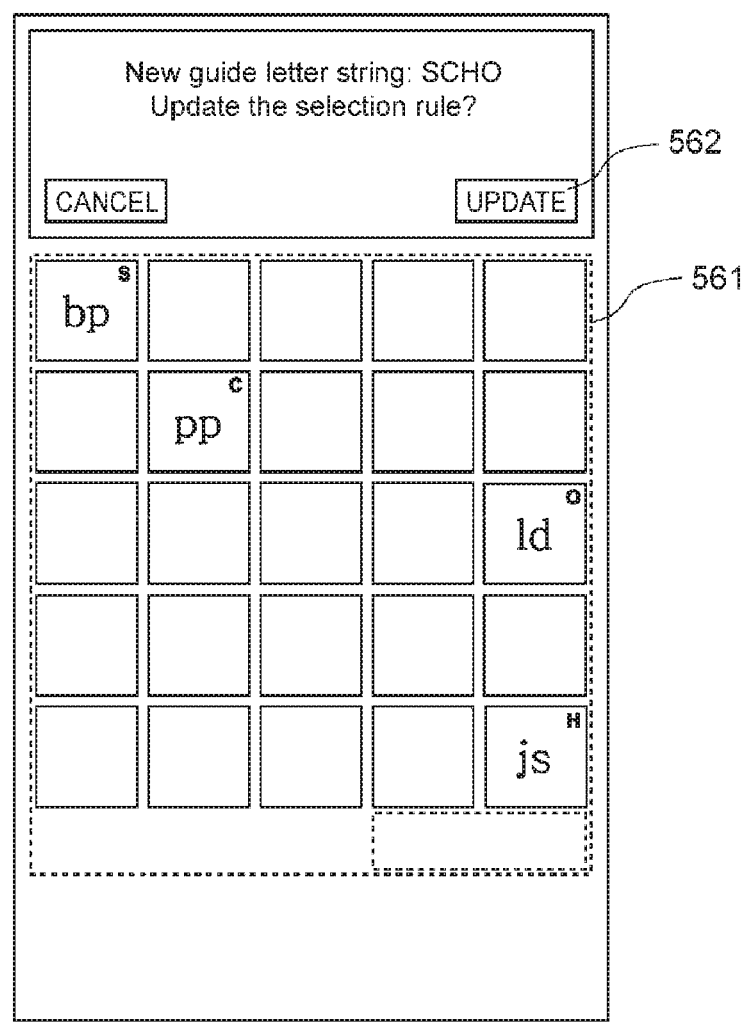
FIG. 9E is an explanatory diagram illustrating how the user selects the fourth part of the new selection sequence.

FIG. 9B is an explanatory diagram illustrating how the user selects the first part of the new selection sequence. FIG. 9C is an explanatory diagram illustrating how the user selects the second part of the new selection sequence. FIG. 9D is an explanatory diagram illustrating how the user selects the third part of the new selection sequence. FIG. 9E is an explanatory diagram illustrating how the user selects the fourth part of the new selection sequence. An explanation will be given below with reference to those figures.

When the user selects, as the first part of the new selection sequence, the element at the first row and first column, as illustrated in FIG. 9B, within the element in the transition table 561 at the first row and first column, the contents of such an element (at the fourth row and second column) selected at first by the user is transferred. In addition, the first letter "S" of the new guide letter string is also indicated apparently.

Next, when the user selects, as the second part of the new selection sequence, the element at the second row and second column, as illustrated in FIG. 9C, within the element in the transition table 561 at the second row and second column, the contents of the element (at the fifth row and third column) selected secondly by the user is transferred. In addition, the second letter "C" of the new guide letter string is also indicated apparently.

Subsequently, when the user selects, as the third part of the new selection sequence, the element at the fifth row and fifth column, as illustrated in FIG. 9D, within the element in the transition table 561 at the fifth row and fifth column, the contents of the element (at the fourth row and fourth column) selected at the third sequence by the user is transferred. In addition, the third letter "H" of the new guide letter string is also indicated apparently.

Eventually, when the user selects, as the fourth part of the new selection sequence, the element at the third row and fifth column, as illustrated in FIG. 9E, within the element in the transition table 561 at the third row and fifth column, the contents of the element (at the third row and fifth column) selected at the last sequence by the user is transferred. In addition, the last letter "O" of the new guide letter string is also indicated apparently.

In this example case, although the location for the fourth part of the selection sequence remains unchanged, the locations for the first to third parts of the selection sequence are changed. A part of the selection sequence may be changed or all selection sequence may be changed at the time of selection sequence update.

As explained above, when the element is selected in the transition table 561 in accordance with the new selection sequence, the password that was referred last time is displayed in sequence within the transition table 561, and the new guide letter string is displayed in sequence. Hence, the user can check whether or not there is a mistake in the entry of the selection sequence so far, and check the new guide letter string that assists the user to memorize the new selection sequence.

Subsequently, the reminder terminal 121 inquires the user as for whether or not to update the selection sequence. When the user wants to update the selection sequence, the user selects an update button 562. In this case, the rule creator 208 of the reminder terminal 121 creates a table conversion rule. This conversion rule satisfies the followings:

(s) the contents of the extracted element in accordance with the selection sequence applied by the user in the sample table are moved to the element to be extracted in accordance with the selection sequence applied by the user in the plain table; and (t) the contents of the element other than the element extracted by the selection sequence assigned beforehand are moved to the element other than the element to be extracted in accordance with the newly assigned selection sequence.

The rule(s) is based on the user instruction. In the above example, in accordance with the rule(s), the element is moved such as:

fourth row and second column→first row and first column;

fifth row and third column→second row and second column;

fourth row and fourth column→fifth row and fifth column; and third row and fifth column→third row and fifth column.

The rule (t) is to move the remaining elements (elements other than the elements contained in the user's selection sequence so far) at random.

The total updater 209 of the reminder terminal 121 updates the table stored in association with each resource server based on the created conversion rule. That is, the tables for all combinations of the resource server names already registered with the user names that are included in the past records are collectively updated based on the common conversion rule. When all tables are updated, the updated information is subjected to a back-up process at the management server 181.

According to this configuration, the user's selection sequence can be easily updated.

For example, an alphabet or a Japanese HIRAGANA in a small size may be displayed at the corner of a grid, and the displayed alphabet, or the like, may be gradually changed so as to be hard-to-view in accordance with the number of display times of the table and the elapsed time after the selection sequence is updated. This enables the user to obtain the password with the aid of the letter at the corner initially, and then to extract the password from the table in accordance with the own selection sequence without the aid of the letter at the corner when the user becomes fluent.

The letter may be displayed at the corner in such a way that, when the letters displayed at the respective corners of the grids are arranged in accordance with the selection sequence, a word, or the like, easy to memorize is obtainable. In this case, the reminder terminal 121 may select, from the dictionary, or the like, a word with the same number of letters as the length of the new selection sequence, but containing different letters from each other, arrange the letters in the spelling of such a word at the corners of the respective elements, and dispose, as for the other element, a letter that does not appear in the selected word without a redundancy at random.

Figure 10:
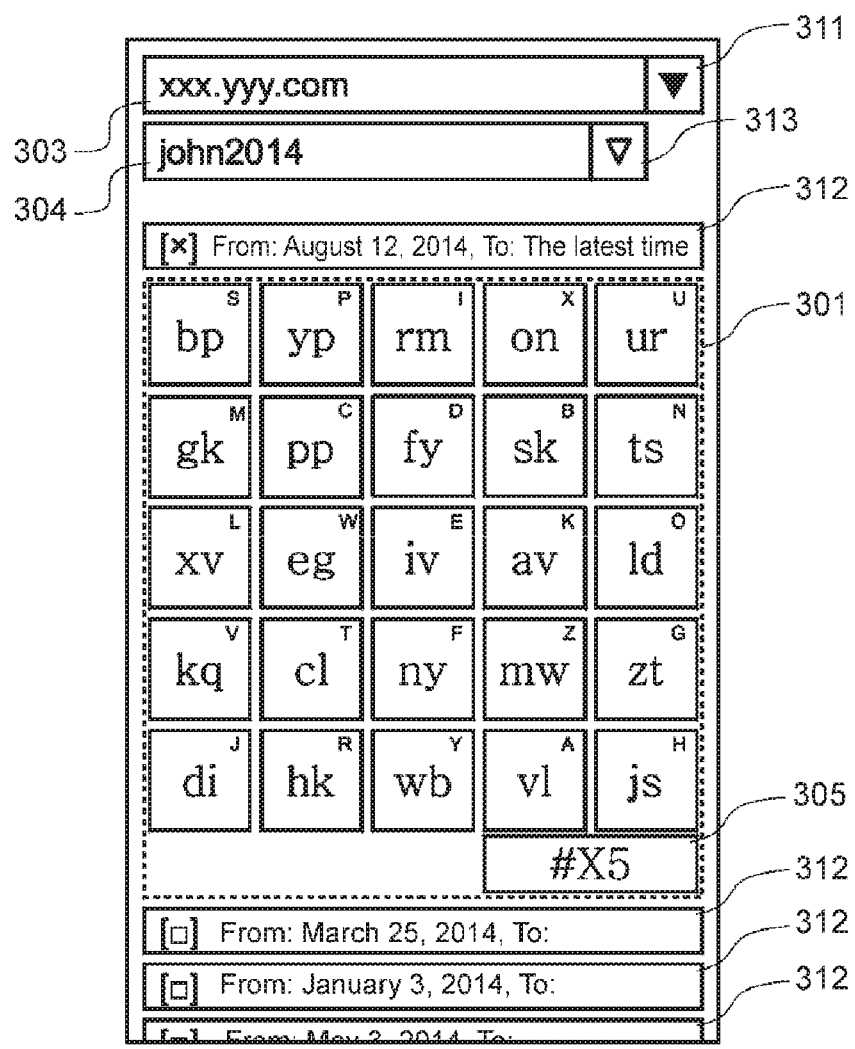
FIG. 10 is an explanatory diagram illustrating how the table is updated based on the new selection sequence.

FIG. 10 is an explanatory diagram illustrating how the table is updated in accordance with the new selection sequence. In this figure, the selection sequence is updated for the table illustrated in FIG. 3A in accordance with the above scheme.

FIG. 11 is an explanatory diagram illustrating the other table before and after the update in accordance with the new selection sequence. This figure illustrates how the selection sequence is collectively updated in accordance with the above scheme for the table stored in association with the combination of the other resource server name with the user name stored at the reminder terminal 121, and the table illustrated in this figure manages a four-digit passcode.

As illustrated in those figures, the position of each element in the table is interchanged between the tables before and after the update based on the common conversion rule to each other. In addition, independently from the interchange based on the conversion rule, the guide letter is also changed before and after the update, but the position of the guide letter is common to that of the table before the update, and is also common to the tables after the update with each other. That is, which position and what guide letter is displayed is common to the table for any resource server 161.

For example, as for the table illustrated in FIG. 3A before the selection rule is updated, the password "bpppjskld#X5" is obtained based on the guide letters "DICE", and as for the table illustrated in FIG. 10 after the selection rule is updated, the password "bpppjsld#X5" is obtained based on the guide letters "SCHO".

Likewise, as for the combination of the server name "www.zzz.com" of the resource server 161 illustrated in FIG. 11 with the user name "paul", since there is no additional element, a four-digit passcode "6441" is obtained based on the guide letters "DICE" before the update, and the same passcode "6441" is obtained based on the guide letters "SCHO" after the update.

When the guide letter string regarding the selection sequence is temporarily held by the reminder terminal 121 at the time of selection sequence update, and then erased from the memory, even if the reminder terminal 121 is theft, the selection sequence is not immediately revealed.

According to this configuration, when the user is not fluent with the new selection sequence, the user is capable of obtaining the password with the aid of the letter at the corner of the grid. When a determination is made that the user fully memorizes the new selection sequence based on, for example, a certain time period having elapsed after the update or a continuous occurrence of a case in which no guide letter is displayed when the table 301 is displayed by a predetermined number of times, the guide letter may be fully erased. In this case, at the time of next selection sequence update, the guide letter utilized so far is not displayed. According to this configuration, a further improved security is obtainable.

(Dependency to Other Resource Server)

In the above configuration, as for the preliminary authentication to utilize the resource of the resource server 161, upon the display of the table for the resource server 161 at the reminder terminal 121, when the preliminary authentication is successful by the cooperative work with the management server 181, the process progresses to the legitimate authentication at the resource server 161 based on the user name and the password, that is, upon confirmation of the allowance condition being satisfied, the process advances to the legitimate authentication. According to this configuration, the resource server 161 inquires the management server 181 as for the success or failure of the preliminary authentication.

The following explanation will be given of an expanded example of this configuration. First of all, this configuration is based on a presumption in which, prior to the legitimate authentication by the resource server 161, the resource server 161 inquires the management server 181 as for the success or failure of the preliminary authentication, and when the management server 181 replies, to the resource server 161, the success of the preliminary authentication, the resource server 161 informs the management server 181 that whether or not the legitimate authentication is successful.

In addition to this presumption, as for the determination standard for the preliminary authentication at a resource server X, in addition to, or in combination with "whether or not the user views the table for the resource server X at the reminder terminal 121", "whether or not the legitimate authentication is successful at a resource server Y on which the resource server X depends, and the present time point is within a predetermined dependency time period from the date and hour of the success" is also adopted. The dependency time period can be set as appropriate.

After the preliminary authentication at the resource server Y on which the resource server X depends is successful, typically, the legitimate authentication based on the password for the resource server X is executed, but this may be omitted. For example, the legitimate authentication at the resource server X may be omitted within a predetermined short time period after the success of the legitimate authentication at the resource server Y.

In addition, the preliminary authentication may have a settable level. For example, the legitimate authentication will be successful when the user simply views the table for the resource server X at the reminder terminal 121 within a predetermined short time period after the success of the legitimate authentication at the resource server Y, but when a certain time period has elapsed after the success of the legitimate authentication at the resource server Y, the legitimate authentication based on the entry of the password for the resource server X will be required.

The dependency time period can be set as appropriate. In the case of, for example, the resource server Y is an in-school system which enables a student to view a notification from a university or to file a report, and the resource server X is a bulletin-board system provided for the students of a given university from the external company, the dependency time period at the resource server X is from "a time point at which a student makes a successful legitimate authentication at the resource server Y" to "the last day of the year covering the time point at which such a legitimate authentication is successfully made".

A configuration in which the allowance condition is determined after the legitimate authentication, and a configuration in which the legitimate authentication is executed after the preliminary authentication can be combinable with each other. According to the configuration in which the allowance condition is determined after the legitimate authentication, when the legitimate authentication is not successful at the resource server 161, no inquiry to the management server 181 is made. Hence, a communication from the resource server 161 to the management server 181 as for the success or failure of the legitimate authentication is unnecessary.

(Time Synchronous Encryption)

According to the configuration in which the reminder terminal 121 is applied as a special keyboard, in order to enhance the security, an encryption scheme for a time synchronization may be shared between the reminder terminal 121 and the resource server 161. A different seed may be given for each user name managed by a given resource server 161, and the time synchronization may be accomplished by different encryption schemes, or an encryption scheme for the time synchronization based on a single seed may be shared by all users for the resource server 161.

That is, the reminder terminal 121 and the resource server 161 share the encryption scheme for the time synchronization.

The reminder terminal 121 presents the table 301 to the user. At this time, the letter string piece contained in each element may be displayed or hidden. When the user selects all grids of the elements in the table 301 based on the own selection sequence, and eventually selects the grid of the additional element 305, the reminder terminal 121 couples the letter string contained in the respective selected elements with the additional element (may be an empty letter string) to obtain the letter string.

Next, the letter string that is a coupling result is encrypted through the above time synchronous encryption scheme, and the encryption result is sent to the access terminal 141 as the authentication letter string.

Hence, according to this configuration, instead of filling the password field 513 every time the element is selected, upon selection of the grid of the additional element 305, the coupling of the letter string of the respective elements in the table 301 selected so far with the additional element, and the encryption thereof will start.

This user interface is changeable. When, for example, the short-range communication with the access terminal 141 is available, the following structure may be employed. That is, at the reminder terminal 121, an object representing a completion of entry like a "send" button, or the like, is prepared. When the user selects the "send" button, or the like, upon selection of the grid of each element in the table 301, the coupling of the letter string of the respective elements in the table 301 with the additional element, and the encryption thereof will start.

When the authentication letter string is sent from the reminder terminal 121 to the access terminal 141, the access terminal 141 enters the sent letter string in the password field 513. The following processes may be similar to those as explained above, or the login form may be sent to the resource server 161 immediately after the entry.

Upon receiving the request from the access terminal 141, the resource server 161 decrypts the designated authentication letter string in the request based on the time synchronous encryption scheme.

When the decryption is successful, the decrypted letter string is taken as the password, and the authentication is executed.

Conversely, when the decryption is unsuccessful, a consideration is made that an unprocessed password is sent from the access terminal 141, and the authentication is executed.

Alternatively, like the above configuration, every time the user selects each element in the table 301 and the additional element therein, the reminder terminal 121 may send the element to the access terminal 141 in an encrypted manner, and the access terminal 141 may fill each sent and encrypted letter string in the password field 513.

As for the decryption by the resource server 161, the authentication letter string designated in the sent request from the access terminal 141 is divided into encrypted letter string pieces, and decryption is attempted to each divided piece, and when the decryption is successful for all pieces, those are coupled together and taken as the password.

The simplest scheme is to perform encryption in such a way that the encrypted letter string does not contain a certain delimiter letter (for example, a blank), to divide the authentication letter string into pieces at a delimiter letter, and to attempt the decryption to each divided piece.

The simplest time synchronous encryption technology is as follow.

First, the reminder terminal 121 and the resource server 161 share the random-number seed in a time-synchronous manner. This seed is updated for a constant cycle like each several minutes based on a predetermined random-number seed updating algorithm. Since there is a certain error in time between the reminder terminal 121 and the resource server 161, and the user needs a time to enter the information, the reminder terminal 121 obtains the newest and latest seed v at the time point at which the table is presented. The resource server 161 obtains the newest and latest seed u[1], u[2], ..., u[N] at the time point at which the login request reaches. The magnitude of N may be set based on a test result in view of the updating cycle of the shared seed, the distribution of times needed by the user to enter, the error in time for each device, and the like. When the time synchronization is established, this means that there is a seed that satisfies v=u[q] where q is an integer equal to or greater than 1 and equal to or smaller than N.

The reminder terminal 121 and the resource server 161 also share a random-number-string creating algorithm. The random-number-string creating algorithm may be consistent with or different from the above random-number seed updating algorithm. When the seed p is given, a random number string g(p, 1), g(p, 2), and the like, is calculated based on the random-number seed updating algorithm.

When the user selects the element in the table 301 or the additional element therein, and couples the letter string pieces contained in the selected elements, a letter string containing letters s[1], s[2], and the like, is to be obtained.

The reminder terminal 121 calculates, for a k-th letter s[k] in the coupled letter string, a letter:

$$e(g(v,k)),s[k])$$

where the arithmetic processing e(x, y) satisfies the following relationship relative to an arithmetic processing c(x, z) to be explained later:

$$y=c(x,e(x,y))$$

When, for example, e(x, y) and c(x, z) are both argument bitwise exclusive, the above condition is satisfied. In addition, a sum or a difference, such as e(x, y)=y+x, c(x, z)=z−x, are also applicable. An encryption that circulates a letter code within a set of letters that can be acceptable by the resource server 161 as the password may be performed. In the case of, for example, the resource server 161 that allows only 26 alphabet letters as the password letters, e(x, y)=ROT$_x$(y), c(x, z)=ROT$_{-x}$(z) may be applied using an encryption compatible with ROT13.

When a coupled letter string S obtained by the user's selection is a letter string containing M number of letters:

$$S=<s[1],s[2]...,s[M]>,$$

an encrypted letter string E in this case can be expressed as follow:

$$E=<E[1],E[2]...,E[M]>=<e(g(v,1),\\s[1]),e(g(v,2)...,s[2]),e(g(v,M),s[M])>$$

When the resource server 161 receives the authentication letter string E via the access terminal 141, the resource server calculates, for the authentication letter string E, N+1 number of letter strings r[1], r[2], ..., r[N]:

$$r[1]=<c(g(u[1],1),E[1]),c(g(u[1],2)...,E[2]),...\\c(g(u[1]M),E[M])>;$$

$$r[2]=<c(g(u[2],1),E[1]),c(g(u[2],2),E[2])...,c(g(u[2]M),E[M])>;$$

..., and $$r[N]=<c(g(u[N],1),E[1]),c(g(u[N],2),E[2])...,c(g(u[N]M),E[M])>;$$

Next, each of the N number of letter strings r[1], r[2], ..., r[N] and the authentication letter string E are taken as password candidates, and the password authentication is performed. When the password authentication is successful at any letter string r[q], a determination is made that the legitimate authentication based on the user name and the password is successful. When the password authentication is unsuccessful for all of the N number of letter strings r[1], r[2], ..., r[N] and the authentication letter string E, a determination is made that the legitimate authentication is also unsuccessful.

A case in which the password authentication is successful by the authentication letter string E is considerable as a case in which the user directly and manually enters the authentication letter string E in the password field 513. In general, including this configuration, when a determination is made that the user manually enters the password, the resource server 161 may send, for example, an e-mail or a short mail to a mobile phone registered for the user beforehand, and may prompt the user to confirm. That is, the authentication may be made at two stages in order to enhance the security.

According to this encryption scheme, every time the letter s[1], s[2], ..., and the like, is obtained one by one, the encryption is executed, and when the encryption completes up to the last letter (the last of encryption may be determined upon selection of the additional element, or may be determined when the "send" button, or the like, is selected), the value k is set again to be 1, and the encryption scheme is initialized.

In addition, as for the encryption scheme, various configurations, such as interchanging the sequence of letter string by shuffling, and enabling a determination on whether or not the encryption is executed with information like checksum being added, are also applicable.

According to this configuration, by avoiding the communication of the unprocessed password as much as possible, the security is enhanced, and is also suitable for, for example, the structure of the authentication system 101 that has the management server 181 omitted.

(Omission of Information)

In the above configuration, the reminder terminal 121 serves as the security token and the special keyboard which informs the external device that the table 301 associated with the combination of the server name of the resource server 161 to be accessed with the user name to be applied for the access is presented to the user.

However, a configuration is also applicable in which the transmitter 203 is omitted from the reminder terminal 121, and no information is given to the external device at all. A setting may be made for each resource server 161 as for whether or not the transmitter 203 transmits the information.

According to the configuration in which no information is transmitted, the reminder terminal 121 can be only utilized as the device that manages the random password not easy for the user to memorize.

In this case, also, the table 301 displayed by the reminder terminal 121 does not indicate the password itself to log in the resource server 161. Hence, even if the table 301 is subjected to furtively glance by a third person, the password is not immediately revealed.

Therefore, according to this configuration, a function that prints out the table 301 from the reminder terminal 121 on a piece of paper based on the user instruction may be added.

When the paper on which the table 301 is printed is utilized, even if the reminder terminal 121 becomes out of power supply, the log-in to the resource server 161 is still enabled. In addition, when, after the user logs in the resource server 161 using the paper on which the table 301 is printed, the paper is left on a desk, or the like, and a third person furtively glances the table 301, the password is not immediately revealed.

As explained above, in accordance with a necessary security level for the user's application, whether or not to transmit the information and whether or not to print the table 301 on a piece of paper are decided, thereby flexibly coping with the user's application.

(Relationship with Program)

The reminder terminal 121, the access terminal 141, the resource server 161, and the management server 181 according to each of the above embodiments are accomplishable by executing various programs on the hardware of various computers.

In general, a computer reads a program stored in a non-transitory information recording medium in a Random Access Memory (RAM) that is a temporary memory device, and causes a Central Processing Unit (CPU) or a processor to execute instructions contained in the read program. However, in the case of an architecture in which the ROM and the RAM are mapped in a single memory space for execution, the instruction contained in the program stored in the ROM is directly read by the CPU. The CPU or the processor, or the like, works together with the RAM, and the like, to control devices of the hardware, such as a Network Interface Card (NIC), a display, a microphone, or a speaker.

In this case, each program can be recorded in a non-transitory computer readable information recording medium, such as a compact disc, a flexible disk, a hard disk, a magneto-optical disk, a digital video disk, a magnetic tape, a Read Only Memory (ROM), an Electrically Erasable Programmable ROM (EEPROM), a flash memory, or a semiconductor memory. This information recording medium can be distributed and sold independently from each hardware.

In addition, the above program can be distributed to each hardware from a distribution device, or the like, via a transitory transmission medium like a computer communication network independently from the computer that executes the program.

The above program can be described by a programming language for describing the action level of an electronic circuit. In this case, various engineering drawings, such as the wiring diagram of the electronic circuit and the time chart, are created from the above program, and the electronic circuit that forms the above image processing device can be accomplished based on such an engineering diagram. For example, the above image processing device can be accomplished over the hardware re-programmable by a Field Programmable Gate Array (FPGA) technology, and a special-purpose electronic circuit is formed by an Application Specific Integrated Circuit (ASIC) technology.

In this case, each component of the reminder terminal 121, the access terminal 141, the resource server 161, and the management server 181 is configured so as to execute the process assigned thereto.

SUMMARY

As explained above, this authentication system includes a reminder terminal, a resource server, a management server, and an access terminal, in which:

(A) the reminder terminal includes:

a table creator that creates a table having a piece of a letter string contained in each element, the letter string being created at random;

a password register causing a user to view the created table, and prompting the user to (1) extract the element from the presented table in accordance with a selection sequence assigned to the user beforehand, and arrange the pieces of the letter string contained in the extracted elements to obtain a registration letter string, and (2) updates and registers or newly registers the obtained registration letter string as a password for a user name of the user at the resource server;

a memory storing the viewing table in association with a combination of a resource server name of the resource server with the user name;

a presenter presenting, to the user upon selection of the combination by a user instruction, the table stored in association with the combination, and prompting the user to (a) extract the element from the viewing table in accordance with the selection sequence assigned to the user beforehand, and arrange the pieces of the letter string contained in the extracted elements to obtain an authentication letter string, and (b) apply the obtained authentication letter string as a password for requesting a utilization of a resource of the resource server under the user name; and a transmitter that transmits information indicating that the table stored in association with the combination is presented to the user, (B) the management server sets, upon receiving the information transmitted from the reminder terminal at the management server, a validated time period corresponding to the combination relating to the information, and covering a time point at which the management server receives the information;

(C) the resource server transmits, to the management server, an inquiry relating to the user name when the request for utilizing the resource of the resource server under the user name is transmitted from the access terminal to the resource server, and a password relating to the request matches the registered password for the user name at the resource server;

(D) the management server determines, upon receiving the inquiry at the management server, whether or not an allowance condition in which "the inquiry is received by the management server within the validated time period set for the combination of the server name of the resource server that is a transmission originator of the inquiry with the user name relating to the inquiry" is satisfied, and transmits, to the resource server, a reply designating the determination result; and (E) the resource server transmits, to the access terminal, a response as for the utilization of the resource of the resource server when the reply is received by the resource server, and the received reply indicates that the allowance condition is satisfied.

In this authentication system, when the access terminal and the reminder terminal are communicably connected with each other by a wired connection or by a wireless connection established within a predetermined distance, the information may be transmitted to the access terminal via the wired connection or the wireless connection, and when a login form to enter the user name and the password relating to the request for utilization of the resource server from the access terminal is displayed on a screen of the access terminal, and the server name relating to the selected combination at the reminder terminal is the server name of the resource server, the access terminal may enter the user name relating to the selected combination in a user name field of the login form, the reminder terminal may cause the user to select the element from the presented table, the reminder terminal may obtain a transmission letter string by arranging pieces of a letter string contained in the respective selected elements, the reminder terminal may transmit, to the access terminal, the obtained transmission letter string via the wired connection or the wireless connection, and the access terminal may enter, in a password field of the login form, the transmission letter string transmitted from the reminder terminal.

In this authentication system, the reminder terminal may present the table in such a way that the piece of the letter string contained in each element of the table is hidden, the reminder terminal may encrypt, through an encryption scheme for a time synchronization with the resource server, the letter string contained in the respective selected elements to obtain the transmission letter string, and the resource server may determine that the password relating to the request is consistent with the registered password for the user name when a decrypted letter string obtained by decrypting the authentication letter string relating to the request through the encryption scheme is consistent with the registered password for the user name.

This reminder terminal is a reminder terminal in the above authentication system, in which:

the reminder terminal may encrypt the letter string contained in the respective selected elements through the encryption scheme every time the user selects the elements from the presented table, and may transmit the encrypted letter string to the access terminal; and the access terminal may additionally enter the transmitted encrypted letter string in the password field of the login form every time the encrypted letter string is transmitted from the reminder terminal.

This reminder terminal may:

create, together with the table, a letter string created at random in a different type from a type of the piece of the letter string contained in each element in the table, and contained in an additional element;

present the created table together with the created additional element to the user to cause the user to view the table; and the registration letter string and the authentication letter string are each obtained by arranging the pieces of the letter string contained in the extracted elements and the additional element.

In this reminder terminal, when an update time period associated with the resource server relating to the combination elapses after the table is stored in association with the combination, the table creator may create a new table, the password register may cause the user to view the created new table, and may prompt the user to (1) extract the element from the viewing new table in accordance with the selection sequence assigned to the user beforehand, and arrange the pieces of the letter string contained in the extracted elements to obtain a new registration letter string, and (2) update and register the obtained new registration letter string as a password for the user name relating to the combination at the resource server, and the reminder terminal may further include a table register that stores the new table in the memory in association with the combination.

This reminder terminal may further include:

an acceptor that accepts, from the user, an entry of the selection sequence assigned to the user beforehand, and that of a selection sequence to be newly assigned to the user;

a rule creator that creates, when the entry is accepted, a conversion rule of (s) moving a content of the extracted element in accordance with the assigned selection sequence beforehand to the element to be extracted in accordance with the newly assigned selection sequence, and (t) moving, at random, a content of the element other than the extracted element in accordance with the selection sequence assigned beforehand to the element other than the element to be extracted in accordance with the newly assigned selection sequence; and a total updater that updates all of the tables stored in the memory by converting the stored table in the memory in accordance with the created conversion rule.

This reminder terminal may create, prior to an acceptance by the acceptor, a guide letter string having a same length as that of the selection sequence, and containing no redundant letter, the acceptor may:

(u) accept the entry of the selection sequence assigned to the user beforehand when the user selects the element from the table, and displays a letter associated with the selection sequence within the created guide letter string on the element every time the element is selected; and (v) accept the entry of the selection sequence to be newly assigned to the user when the user selects the element from the table, and displays a letter associated with the selection sequence within the created guide letter string on the element every time the element is selected, the total updater may assign a guide letter to each position within the table by, among the positions within the table, (x) assigning a letter associated with the selection sequence within the guide letter string to the position to be selected in sequence in accordance with the selection sequence to be newly assigned to the user, and (y) assigning, at random, letters without a redundancy at positions other than the position selected in sequence in accordance with the selection sequence to be newly assigned to the user, and the presenter may present, to the user, the guide letter assigned to each position within the table together with the element at each position when any one of the tables associated with the multiple resource servers is also presented to the user.

In addition, this authentication system includes a reminder terminal, an access terminal, and a resource server, in which:

(a) the access terminal transmits, to the resource server, a user request for utilizing the resource of the resource server;

(b) the resource server transmits, to the access terminal, a login form when receiving the transmitted request;

(c) the access terminal presents, to the user, the received login form when receiving the transmitted login form;

(d) the reminder terminal presents, to the user, a table stored in association with the resource server, and transmits, to the management server or the resource server, information indicating that the table is presented to the user;

(e) the access terminal accepts, from the user through an entry field contained in the presented login form, a password obtained by arranging elements extracted from the presented table in accordance with a selection sequence assigned to the user beforehand, and transmits the accepted password to the resource server;

(f) the management server or the resource server sets, when receiving the information, a validated time period covering the time point at which the information is received; and (g) the resource server decides the acceptance or rejection of the request from the user based on the received password when the time point at which the password is received is within the set validated time period.

In this authentication system,
the reminder terminal may transmit the information to the management server; and
the resource server may inquire the management server as for the validated time period or inquire the management server as for whether or not the time point at which the password is received is within the set validated time period.

In this authentication system,
the reminder terminal may transmit the information to the management server;
the access terminal may inquire the management server as for the validated time period or inquire the management server as for whether or not the present time point is within the set validated time period, and may (i) set the entry field so as to accept the password from the user when the present time point is within the set validated time period, and (j) set the entry field so as not to accept the password from the user when the validated time period is not set or when the present time point is out of the set validated time period.

In this authentication system,
the access terminal may cause the management server to transmit a notification to the reminder terminal upon accepting an instruction for reminder display relating to the resource server from the user to whom the login form is presented, and
the reminder terminal may present, to the user, the table stored in association with the resource server upon reception of the notification.

In this authentication system,
the reminder terminal that has presented the table to the user may accept an entry of the password from the user, and transmit the entered password to the access terminal, and
the access terminal may enter the transmitted password in the login form.

In this authentication system,
the reminder terminal may
create a new table at random when an update time period associated with the resource server elapses after the table is stored in association with the resource server,
prompt the user to update the password for the resource server to a new password obtained by arranging the extracted elements from the created table in accordance with the selection sequence assigned to the user beforehand, and
store the new table in association with the resource server when the password to the resource server is updated to the new password.

In this authentication system,
the presented table may contain an additional element in a margin, and
the password may be obtained by extracting the elements from the presented table in accordance with the selection sequence assigned to the user beforehand and arranging the extracted elements together with the additional element contained in the margin of the presented table.

In this authentication system,
the authentication system may include the other resource server, and
the other resource server decides, upon receiving the other request from the user who attempts to utilize the resource of the other resource server from the access terminal, the acceptance or rejection of the other request from the user based on the decision made for acceptance or rejection of the request to the resource server, and the time point at which the decision is made.

This reminder terminal includes:
a memory storing a table in association with each resource server among multiple resource servers; and
a presenter presenting, to the user, the table stored in the memory in association with the selected resource server by a user instruction to select any of the multiple resource servers, in which:
each element in the table associated with each resource server contains information created at random; and
a password for a decision of acceptance or rejection of the utilization of the resource of each resource server is obtained by arranging the extracted elements from the table associated with each resource server in accordance with the selection sequence assigned to the user beforehand.

This reminder terminal may further include a transmitter transmitting, to the management server or to each resource server associated with the table, information indicating that the table is presented to the user.

This reminder terminal may further include:
a table creator that creates a new table when an update time period associated with each resource server elapses after the table associated with each resource server of the multiple resource server is stored in association with each resource server;
a password updater that prompts the user or instructs the management server to update the password for a decision of acceptance or rejection for the utilization of the resource of the resource server by the user to a new password obtained by arranging extracted elements from the created table in accordance with the selection sequence assigned to the user beforehand; and
a table register that stores the new table in association with the resource server when the password for a decision of acceptance or rejection for the utilization of the resource of the resource server by the user is updated to the new password.

This reminder terminal may further include:
an acceptor that accepts, from the user, an entry of the selection sequence assigned to the user beforehand, and that of a selection sequence to be newly assigned to the user;
a rule creator that creates, when the entries are accepted, a conversion rule of (s) moving a content of the extracted element in accordance with the assigned selection sequence beforehand to the element to be extracted in accordance with the newly assigned selection sequence, and (t) moving, at random, a content of the element other than the extracted element in accordance with the selection sequence assigned beforehand to the element other than the element to be extracted in accordance with the newly assigned selection sequence; and
a total updater that updates all of the tables stored in the memory by converting the stored table in the memory in association with each resource server of the multiple resource servers in accordance with the created conversion rule.

In this reminder terminal,
the stored table may contain an additional element in a margin, and the password may be obtained by extracting the elements from the presented table in accordance with the selection sequence assigned to the user beforehand and arranging the extracted elements together with the additional element contained in the margin of the stored table.

The reminder terminal may create, prior to an acceptance by the acceptor, a guide letter string having a same length as that of the selection sequence, and containing no redundant letter;

the acceptor may:

(u) accept the entry of the selection sequence assigned to the user beforehand when the user selects the element from the table, and displays a letter associated with the selection sequence within the created guide letter string on the element every time the element is selected; and (v) accept the entry of the selection sequence to be newly assigned to the user when the user selects the element from the table, and displays a letter associated with the selection sequence within the created guide letter string on the element every time the element is selected, and the total updater may assign a guide letter to each position within the table by, among the positions within the table, (x) assigning a letter associated with the selection sequence within the guide letter string to the position to be selected in sequence in accordance with the selection sequence to be newly assigned to the user, and (y) assigning, at random, letters without a redundancy at positions other than the position selected in sequence in accordance with the selection sequence to be newly assigned to the user.

In this reminder terminal, the presenter may present, to the user, the guide letter assigned to each position within the table together with the element at each position when any one of the tables associated with the multiple resource servers is also presented to the user.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority based on International Application No. PCT/JP2014/073704 filed on Sep. 8 (Monday), 2014 to the WIPO, the entire disclosure of which is herein incorporated in this specification as long as the Laws of designated countries permit.

INDUSTRIAL APPLICABILITY

According to the present disclosure, provided are an authentication system suitable for managing, at a reminder terminal, a password to decide an acceptance or a rejection of a request for utilizing the resource of a resource server, the reminder terminal, and a non-transitory computer readable information recording medium having stored therein a program that causes a computer to function as the reminder terminal.

REFERENCE SIGNS TABLE

101 Authentication system
121 Reminder terminal
141 Access terminal
161 Resource server
181 Management server
191 Computer communication network
201 Memory
202 Presenter
203 Transmitter
204 Table creator
205 Password register
206 Table register
207 Acceptor
208 Rule creator
209 Total updater
301 Table
303 Server ID
304 User name
305 Additional element
311 Navigation
312 Navigation
313 Navigation
321 Completion button
322 Cancel button
501 Browser
502 URL field
503 Contents field
511 Login form
512 User name field
513 Password field
514 Login button
521 Plug-in icon
551 Sample table
552 Proceed button
561 Transition table
562 Update button

The invention claimed is:

1. An authentication system comprising a reminder terminal, a resource server, a management server, and an access terminal, wherein:

(A) the reminder terminal comprises: a table creator that creates a table letter strings contained in elements respectively, the letter strings being created at random;
a password register configured to cause a user to view the created table, and prompt and provide for the user to (1) extract first elements from a presentation of the table in accordance with a selection sequence assigned to the user beforehand, and arrange first letter strings contained in the extracted first elements to obtain a registration letter string, and (2) update and register or newly register the obtained registration letter string as a password for a user name of the user at the resource server;
a memory storing the table in association with a combination of a resource server name of the resource server with the user name;
a presenter configured to, after selection of the combination by a user instruction, present to the user the table stored in association with the combination, and prompt the user to (a) extract second elements from the table in accordance with the selection sequence assigned to the user beforehand, and arrange second letter strings contained in the extracted second elements to obtain an authentication letter string, and (b) apply the obtained authentication letter string as a password for requesting a utilization of a resource of the resource server under the user name; and a transmitter that transmits information indicating that the table stored in association with the combination is presented to the user, (B) the management server sets, upon receiving the information transmitted from the reminder terminal, a validated time period corresponding to the combination and the information, and including a time point at which the management server receives the information;

(C) the resource server transmits, to the management server, an inquiry relating to the user name when the request for utilizing the resource of the resource server under the user name is transmitted from the access terminal to the resource server, and a password relating to the request matches the registered password for the user name at the resource server;

(D) the management server determines, upon receiving the inquiry at the management server, whether or not an allowance condition in which the inquiry is received by the management server within the validated time period set for the combination of the server name of the resource server that is a transmission originator of the inquiry with the user name relating to the inquiry is satisfied, and transmits, to the resource server, a reply designating the determination result; and (E) the resource server transmits, to the access terminal, a response as for the utilization of the resource of the resource server when the reply is received by the resource server, and the received reply indicates that the allowance condition is satisfied.

2. The authentication system according to claim 1, wherein:

when the access terminal and the reminder terminal are communicably connected with each other by a wired connection or by a wireless connection established within a predetermined distance, the information is transmitted to the access terminal via the wired connection or the wireless connection; and when a login form to enter the user name and the password relating to the request for utilization of the resource server from the access terminal is displayed on a screen of the access terminal, and the server name relating to the selected combination at the reminder terminal is the server name of the resource server, the access terminal enters the user name relating to the selected combination in a user name field of the login form;

the reminder terminal causes the user to select the element from the presented table;

the reminder terminal obtains a transmission letter string by arranging letter strings contained in the respective selected elements;

the reminder terminal transmits, to the access terminal, the obtained transmission letter string via the wired connection or the wireless connection; and the access terminal enters, in a password field of the login form, the transmission letter string transmitted from the reminder terminal.

3. The authentication system according to claim 2, wherein:

the reminder terminal presents the table in such a way that the letter strings in the elements of the table are hidden;

the reminder terminal encrypts, through an encryption scheme for a time synchronization with the resource server, the letter string contained in the respective selected elements to obtain the transmission letter string; and the resource server determines that the password relating to the request is consistent with the registered password for the user name when a decrypted letter string obtained by decrypting the authentication letter string relating to the request through the encryption scheme is consistent with the registered password for the user name.

4. The authentication system according to claim 3, wherein:

the reminder terminal encrypts the letter string contained in the respective selected elements through the encryption scheme every time the user selects the elements from the presented table, and transmits the encrypted letter string to the access terminal; and the access terminal additionally enters the transmitted encrypted letter string in the password field of the login form every time the encrypted letter string is transmitted from the reminder terminal.

5. The authentication system according to claim 4, wherein the reminder terminal:

creates, together with the table, a letter string created at random as an additional element;

presents the created table together with the created additional element to the user to cause the user to view the table; and the registration letter string and the authentication letter string are each obtained by arranging the letter strings contained in the extracted elements and the additional element.

6. The authentication system according to claim 4, wherein:

when an update time period associated with the resource server relating to the combination elapses after the table is stored in association with the combination, the table creator creates a new table;

the password register causes the user to view the created new table, and prompts the user to (1) extract new elements from the viewed new table in accordance with the selection sequence assigned to the user beforehand, and arrange new letter strings contained in the extracted new elements to obtain a new registration letter string, and (2) update and register the obtained new registration letter string as the password for the user name relating to the combination at the resource server; and the reminder terminal further comprises a table register that stores the created new table in the memory in association with the combination.

7. The authentication system according to claim 4, further comprising:

an acceptor that accepts, from the user, an entry of the selection sequence assigned to the user beforehand, and that of a selection sequence to be newly assigned to the user;

a rule creator that creates, when the entry is accepted, a conversion rule of (s) moving a content of each of the extracted elements in accordance with the assigned selection sequence beforehand to an element to be extracted in accordance with the newly assigned selection sequence, and (t) moving, at random, a content of each element other than the extracted elements in accordance with the selection sequence assigned beforehand to any one of the elements other than the elements to be extracted in accordance with the newly assigned selection sequence; and a total updater that updates all of the tables stored in the memory by converting the stored table in the memory in accordance with the created conversion rule.

8. The authentication system according to claim 7, wherein:

the reminder terminal creates, prior to an acceptance by the acceptor, a guide letter string having a same length as that of the selection sequence, and containing no redundant letter;

the acceptor:

(u) accepts the entry of the selection sequence assigned to the user beforehand when the user selects the element from the table, and displays a letter associated with the selection sequence within the created guide letter string on the element every time the element is selected; and (v) accepts the entry of the selection sequence to be newly assigned to the user when the user selects the element from the table, and displays a letter associated with the selection sequence within the created guide letter string on the element every time the element is selected, the total updater assigns a guide letter to each position within the table by, among the positions within the table, (x) assigning a letter associated with the selection sequence within the guide letter string to the position to be selected in sequence in accordance with the selection sequence to be newly assigned to the user, and (y) assigning, at random, letters without a redundancy at positions other than the position selected in sequence in accordance with the selection sequence to be newly assigned to the user; and the presenter presents, to the user, the guide letter assigned to each position within the table together with the element at each position when any one of the tables associated with the multiple resource servers is also presented to the user.

9. A non-transitory computer readable information recording medium having stored therein a program that causes a computer to function as each component of the reminder terminal according to claim 4.

10. The authentication system according to claim 1, wherein the resource server, and the management server are accomplished by a single server computer.

* * * * *